United States Patent [19]
Biggs, Jr. et al.

[11] Patent Number: 5,475,740
[45] Date of Patent: Dec. 12, 1995

[54] SYSTEM FOR ACCESSING AND PAYING FOR AMENITIES USING A TELEPHONE

[75] Inventors: Lawrence R. Biggs, Jr.; Harry S. Budow, both of Plano, Tex.

[73] Assignee: Spectradyne, Inc., Richardson, Tex.

[21] Appl. No.: 80,919

[22] Filed: Jun. 22, 1993

Related U.S. Application Data

[63] Continuation-in-part of Ser. No. 29,851, Mar. 11, 1993, Pat. No. 5,323,448.

[51] Int. Cl.⁶ .................................................. H04M 11/00
[52] U.S. Cl. .............................. 379/91; 379/105; 348/3; 348/7
[58] Field of Search ................................ 348/1, 3, 6–8, 348/10–13; 379/105, 91

[56] References Cited

U.S. PATENT DOCUMENTS

| | | |
|---|---|---|
| 3,740,530 | 6/1973 | Hoffer et al. . |
| 3,742,453 | 6/1973 | Poylo . |
| 3,781,805 | 12/1973 | O'Neal, Jr. . |
| 3,793,565 | 2/1974 | Smith . |
| 3,846,622 | 11/1974 | Meyer . |
| 3,920,908 | 11/1975 | Kraus . |
| 3,959,607 | 5/1976 | Vargo . |
| 4,008,369 | 2/1977 | Theurer et al. . |
| 4,439,636 | 3/1984 | Newkirk et al. . |
| 4,595,983 | 6/1986 | Gehalo et al. . |
| 4,648,327 | 3/1987 | Toth et al. . |
| 4,654,482 | 3/1987 | DeAngelis . |
| 4,672,661 | 6/1987 | Clark, Jr. et al. . |
| 4,700,386 | 10/1987 | Kohn ............................................. 348/7 |
| 4,731,818 | 3/1988 | Clark, Jr. et al. . |
| 4,763,191 | 8/1988 | Gordon et al. . |
| 4,791,640 | 12/1988 | Sand . |
| 4,797,913 | 1/1989 | Kaplan et al. . |
| 4,803,348 | 2/1989 | Lohrey et al. . |
| 4,818,854 | 4/1989 | Davies et al. . |
| 4,847,890 | 7/1989 | Solomon et al. . |

(List continued on next page.)

FOREIGN PATENT DOCUMENTS

| | | |
|---|---|---|
| 0342314A3 | 11/1989 | European Pat. Off. . |
| 2184919 | 7/1987 | United Kingdom . |
| 2219713 | 12/1989 | United Kingdom . |
| WO87/02208 | 4/1987 | WIPO . |

OTHER PUBLICATIONS

Jun–ichi Mizusawa et al., "IC Card–Based Advanced Man–Machine Interface for Public Switched Telephone Network Service", *Electronics and Communications in Japan*, Part 1, vol. 73, No. 1, 1990.

*Primary Examiner*—Wing F. Chan
*Attorney, Agent, or Firm*—Haynes and Boone

[57] ABSTRACT

System for enabling user access to and payment for amenities using a telephone is disclosed, The system includes a telephone for entering billing and amenity identification information connected to a central distribution computer for storing and processing entered billing and amenity selection information to facilitate payment for and presentation of the selected amenity, A pay-per-view system is connected to the central distribution computer for displaying the amenity, The central distribution computer comprises a store-and-forward switch connectable to the telephone for storing and processing the entered information and for issuing audio user prompts via the phone and a graphics circuit for generating graphic user prompts and/or amenity promotional information via the pay-per-view system. The user prompts are generated in response to the processing and are used to assist the user in selecting and paying for an amenity, A billing data base is connected to the central distribution computer for validating entered billing information entered and returning an authorization signal to the central distribution computer, The central distribution computer may also be connected to a computerized property management system for storing billing information based on an unique identification code of the amenity location of the telephone and to a telecommunications network for enabling access to remote billing services and remote amenities.

45 Claims, 10 Drawing Sheets

U.S. PATENT DOCUMENTS

| | | |
|---|---|---|
| 4,857,714 | 8/1989 | Sunyich . |
| 4,860,336 | 8/1989 | D'Avello et al. |
| 4,860,341 | 8/1989 | D'Avello et al. . |
| 4,868,846 | 9/1989 | Kemppi . |
| 4,883,948 | 11/1989 | Sunyich . |
| 4,890,320 | 12/1989 | Monslow et al. . |
| 4,893,248 | 1/1990 | Pitts et al. ................................. 348/10 |
| 4,916,737 | 4/1990 | Chomet ..................................... 348/3 |
| 4,920,562 | 4/1990 | Hird et al. . |
| 4,928,168 | 5/1990 | Iwashita ..................................... 348/3 |
| 4,935,956 | 6/1990 | Hellwarth et al. . |
| 4,939,352 | 7/1990 | Sunyich . |
| 4,949,187 | 8/1990 | Cohen . |
| 4,969,183 | 11/1990 | Reese . |
| 4,975,942 | 12/1990 | Zebryk . |
| 5,077,607 | 12/1991 | Johnson et al. ........................... 348/13 |
| 5,089,885 | 2/1992 | Clark ........................................... 348/7 |

SYSTEM FOR ACCESSING AND PAYING FOR AMENITIES USING A TELEPHONE

CROSS REFERENCE TO RELATED APPLICATION

This application is a continuation-in-part of U.S. application Ser. No. 08/029,851, filed Mar. 11, 1993, now U.S. Pat. No. 5,323,448, for System for Accessing Amenities through a Public Telephone Network, incorporated herein by reference.

TECHNICAL FIELD

The present invention pertains in general to telephone systems and pay-per-view television systems, and more particularly, to a system for accessing and paying for amenities, especially video entertainment amenities, such as movies, using a telephone.

BACKGROUND OF THE INVENTION

Hotels and similar establishments operate in a relatively competitive business environment. As such, they always strive to obtain some leverage over their competitors. Other than utilizing competitive pricing structures, some establishments have chosen to offer various amenities as an attraction. These amenities can be in the form of free movies, in-room refreshment centers, vibrating beds, etc. However, one disadvantage to these types of systems is that, at present, most establishments control the billing for these amenities, and, therefore, they are required to maintain appropriate equipment on site or at some central location. For example, one amenity that is offered by most hotel establishments is pay-per-view television. A customer typically will call the front desk in the hotel and request that a particular program be authorized for his in-room television. When the program comes on at the designated time, it can be received by a decoder box on the customer's TV. This will then appear on the customer's bill when he checks out. However, this can typically result in problems, in that the customer sometimes denies that he requested it and, therefore, it does not get billed. The hotel therefore loses some income and, also, the firm that provides the actual amenity in the form of the movies also loses revenue.

Alternatively, many hotels utilize pay-per-view television systems wherein movie selection and billing are controlled by a central distribution computer. Characteristically, the central distribution computer controls the devices that transmit the movie, typically video tape players or a video tape player controller. The central distribution computer also is connected to a device located with the television set in the customer's room, generally called a "room unit," that allows the customer to choose the programming viewed on the television set. The central distribution computer monitors and controls the input and output signals from the video tape players and the room units and is able to control when the video tape player plays the appropriate movie. The central distribution computer is able to store and transmit graphic screens that are utilized to explain to the customer how to use the pay-per-view movie service and list the program choices. In addition, graphic screens can be used for advertisement or promotional purposes. After the movie is selected and transmission has begun, the central distribution computer continues to monitor the room unit to determine if the consumer is to be billed for the service. Often, the first several minutes of the program are shown without any charge to the consumer. The central distribution computer also performs diagnostic functions. Generally, the transaction is printed by a printer connected to the central distribution computer and/or added to the room bill. However, pay-per-view television systems currently in use do not have an automated means by which customers can pay for the movie at the point-of-sale or separate from the room bill.

Many hotels and similar establishments have installed computerized property management systems. In such facilities, the central distribution computer is able to connect to the computerized property management system. If requested by the customer, the central distribution computer can retrieve the customer's information, including a record of expenses and check-out bill, format it as a screen, and transmit it to the television set. However, all hotels, especially larger ones, would like to give their customers additional options for inputting billing information. Smaller hotels often lack the sophisticated equipment to transmit the bill to the room or allow customers to pay for the bill from the room once the bill has been reviewed. In addition, their customers often pay for the room during check-in. Accordingly, the payment for amenities, such as movies, must be collected at the point-of-sale.

One type of system that has been utilized to provide an amenity, long distance telephone calling, utilizes a credit card reader at the phone that automatically validates a customer's credit card before allowing the phone call to go through. This validation is generally done off site, away from the establishment, but can be done on the premises by a separate business entity, and the billing is completely independent of the establishment. Therefore, the customer is allowed to make long distance phone calls with his credit card without having it billed to the room. The establishment, therefore, does not have to maintain the billing system nor does it have to process the credit card transactions in order to collect for these long distance telephone calls. Rather, a separate service does the validation and the billing, and, in some instances, provides some type of remuneration to the establishment in the form of a percentage of the profits.

SUMMARY OF THE INVENTION

The present invention disclosed and claimed herein comprises a system for accessing and paying for amenities, especially video entertainment amenities, such as movies, using a telephone. The system includes a telephone for entering billing and amenity identification information and having an amenity keypad with buttons corresponding to particular amenity selections, as well as a normal telephone keypad, and a credit card reader to facilitate entry of billing information. The telephone is connected to a central distribution computer, which stores and processes the billing and amenity selection information to facilitate payment for and presentation of the selected amenity. A pay-per-view system is connected to the central distribution computer for displaying the amenity and certain graphic user display prompts generated by the central distribution computer. The pay-per-view system may comprise, for example, a video unit connected to the central distribution computer for initiating amenity presentation, responsive to selection and payment by the user, a room unit connected to the video unit for receiving the amenity presentation, promotional information, and/or advertisements at a selected amenity location, e.g., the user's hotel room, and a television connected to the room unit for displaying the amenity presentation and graphic user prompts to the user.

In one embodiment, the central distribution computer is connected to a store-and-forward switch, which switch is connectable to the telephone for storing and processing the entered billing and amenity information and for issuing audio voice prompts to the user, responsive to receipt of user input via the telephone keypads and/or card reader, to assist the user in selecting and paying for an amenity and to confirm receipt of billing and amenity selection information. In an alternative embodiment, the central distribution computer and the store-and-forward switch are combined onto a single platform.

The central distribution computer is also connected to a billing data base for validating billing information entered by the user, which is received by the billing data base from the central distribution computer. Responsive to receipt of the billing information, the billing data base returns an authorization signal to the central distribution computer. This is referred to as "pre-validation." The central distribution computer will inhibit the presentation of the selected amenity until the authorization signal is returned. Alternatively, the central distribution computer can store the billing information so that it may be validated and processed after the amenity transaction has been completed. This is known as "post-validation."

The central distribution computer also comprises a graphics circuit connected to the store-and-forward switch for generating graphic user display prompts for promotional or instructional purposes, which are displayed on the pay-per-view system. The audio prompts and graphic display prompts are synchronized with one another to convey consistent information to the user responsive to user input.

In a preferred embodiment, the telephone is connected to the central distribution computer via a private branch exchange (PBX). In addition, a computerized property management system is connected to the central distribution computer for storing billing information based on an unique identification code of the amenity location. The billing information stored in the property management system may be subsequently accessed by the central distribution computer for display via the pay-per-view system as the total amount owed by or billed to the user. In this embodiment, the telephone and pay-per-view television systems also can be used to order and pay for other hotel services that typically are billed through the property management system, such as meals, room service, and can also be used for reviewing and paying the hotel bill at check-out. The central distribution computer and telephone may also be connected to a telecommunications network for enabling access to remote billing services and remote amenities.

In operation, billing and amenity information input by the user is transmitted to the central distribution computer. The billing information is forwarded to the billing data base to determine whether the credit card is valid. Once the central distribution computer receives confirmation that the billing information is valid, the store-and-forward switch and the central distribution computer transmit audio voice prompts and graphic display prompts, respectively, to the user via the telephone and the PPV system to assist the user in paying for and selecting an amenity. Graphic display prompts may already be shown on the pay-per-view system prior to action being taken by the user, after which the display prompts are used to interact with the user. The billing information is stored in the central distribution computer and/or the property management system, if one is provided, for later access and use by the system.

A technical advantage achieved with the invention is that movies, and other goods and services, may be selected at an amenity location and billed directly to a user's credit card at the time of selection.

Another technical advantage achieved with the invention is that a customer can use the telephone system to directly interact with the central distribution computer and the pay-per-view television system, to facilitate the selection of pay-per-view movies and the utilization of amenity services.

Another technical advantage achieved with the invention is that, through connecting the telephone system to the central distribution computer, a customer has access to the property management system and has the option to pay the hotel bill using the telephone system's card reader.

Another technical advantage achieved with the invention is that billing validation and other processing may be performed at a remote, centralized location. This facilitates the update, administration and collection process for a large number of amenity locations.

Another technical advantage achieved is that the provision of a central distribution computer enables centralized, remote update and management of movie offerings at a large number of amenity locations.

DETAILED DESCRIPTION OF THE PREFERRED EMBODIMENT

Figure 1:
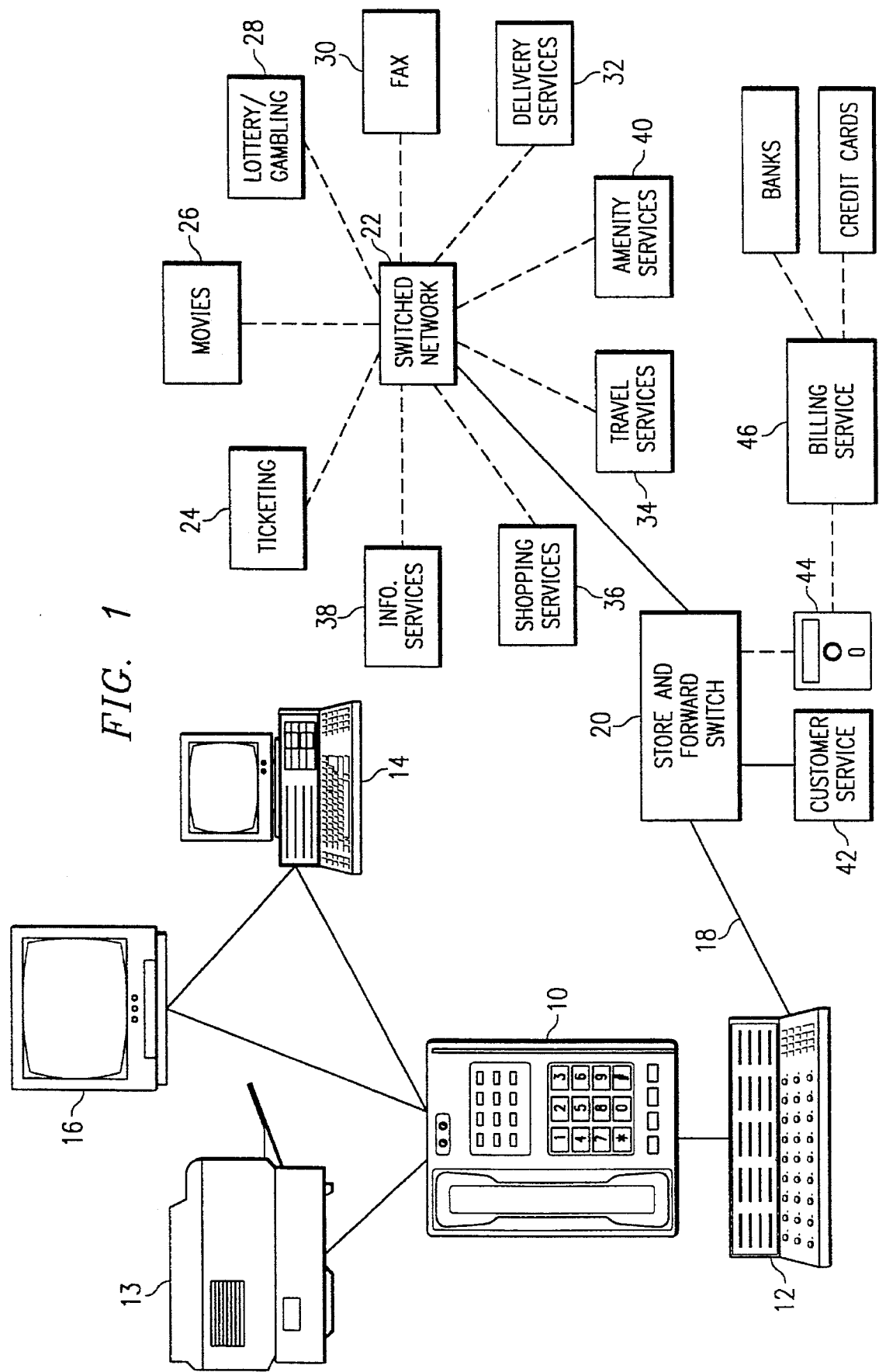
FIG. 1 illustrates a block diagram of the access system of the present invention.

Referring now to FIG. 1, there is illustrated a system diagram for the access system of the present invention. An access phone 10 is provided that is interconnected with an extension on a private branch exchange (PBX) 12. Although only one access phone 10 is illustrated, it should be understood that a plurality of access phones 10 are provided in a given establishment, such as a hotel or a hospital. The access phone 10 can be interfaced with a FAX machine 13, a personal computer 14, or a television 16 such that information can be transmitted therefrom through the access phone 10. The PBX 12 has a plurality of trunk lines 18 connected to a store-and-forward switch 20. The store-and-forward switch 20, as described hereinbelow, basically comprises a device that can buffer a dialed phone number or call up pre-stored phone numbers, examine the dialed phone number and the associated data, such as authorization codes, and then forward a call to a number that was either dialed in or accessed from internal memory. Some features of the store-and-forward switch have been known with respect to autodialers.

Figure 7:
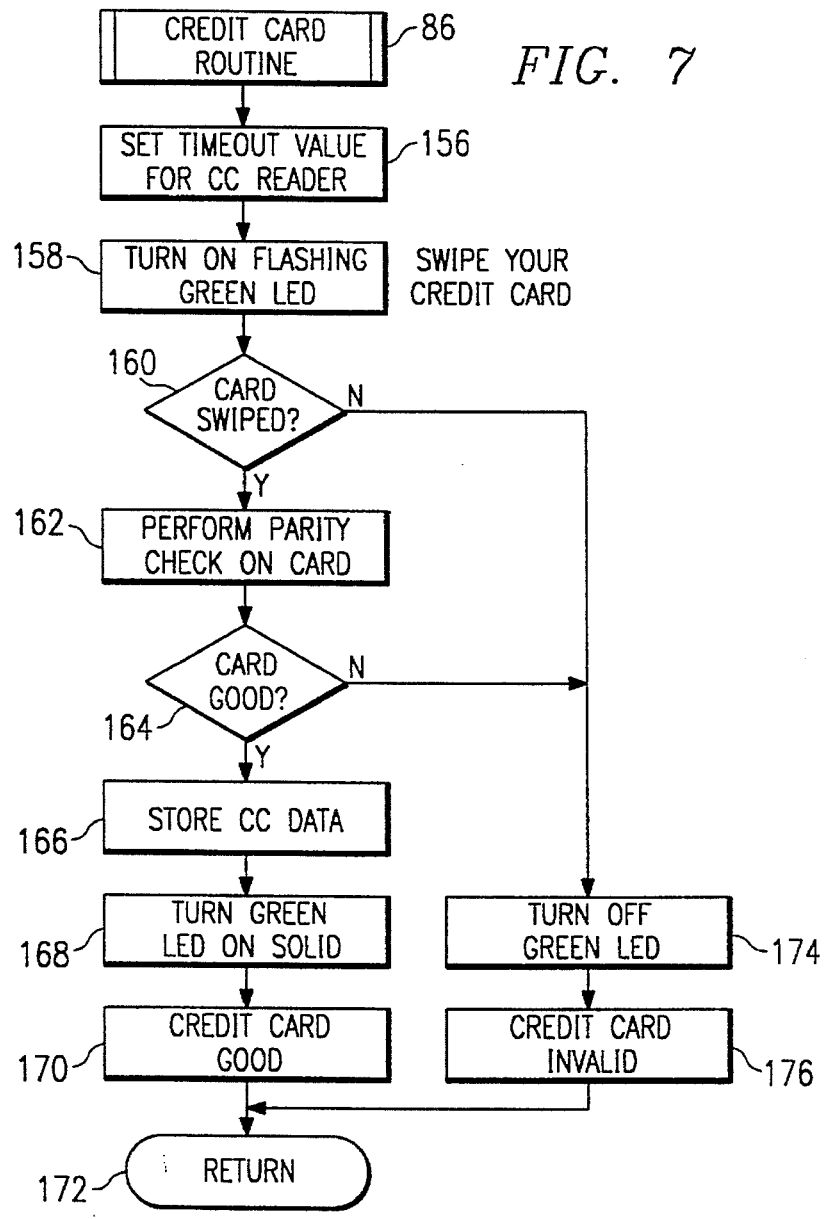
FIG. 7 illustrates a flow chart of a credit card routine of the present invention.

The store-and-forward switch 20 is operable to receive information from the access phone 10 through the PBX 12 in the form of credit card information. This credit card information is recognized by the store-and-forward switch 20 and then a validation routine, which is described in detail with reference to FIG. 7, is executed to validate the card number against a database. After validation, additional information that was transmitted to the store-and-forward switch 20 with the credit card number, such as an amenity identification number, is utilized to determine the selected amenity. A pre-stored authorization code associated with the selected amenity is then sent to the selected amenity through the switch network 22 and, upon acknowledgment, the access phone 10 is then connected to the amenity. For example, a ticketing service 24 is provided, a movie service 26 is provided, a lottery/gambling service 28 provided, travel services 35 are provided, shopping services 36 are provided, information services 38 are provided, and various other amenity services 40 are provided.

The store-and-forward switch 20 can receive the information from the access phone 10 in the form of a message that includes an origination number, a request for a specific service, the user's credit card number and expiration date, as well as other relevant data. Internal to the switch 20 is stored specific routing information and action requirements that relate to each type of service requested. This information is utilized to make the connection between the access phone 10 and the various amenities on the switching network 20.

In the event that validation of the credit card is not achievable, the store-and-forward switch 20 defaults to a customer service operator 42 which then makes a voice connection with the user at the access phone 10. This allows manual validation of the card, in the event that the characters from the user's card were not read correctly. Further, an output tape or storage media 44 is provided which maintains the billing information. This billing information is a record that is maintained by the store-and-forward switch 20 for later forwarding to clearing houses such as the billing service 46, that routes the information to the appropriate destination.

The system of the present invention is operable to provide a way for an establishment to provide for all the amenities through a telephone and facilitate the billing for the services at a remote location and by a separate entity. The establishment need only contract for the access phone 10 to be placed into a room and nothing else need be done. As will be described hereinbelow, the entire access phone 10 is "line-powered" such that additional power supplies are not required. This allows the access phone 10 to be plugged directly into the wall socket without requiring further hookup.

The entire billing procedure is performed at the store-and-forward switch 20 at the remote locations and neither the amenities nor the establishment contracting for the access phone 10 have the responsibility for validation of the card or retaining billing information. The amenities will typically bill the operator of the system at the store-and-forward switch 20 for their services, this possibly having a volume discount associated therewith, and the operator of the system will then be responsible for collecting the money through the credit card services.

Figure 1A:
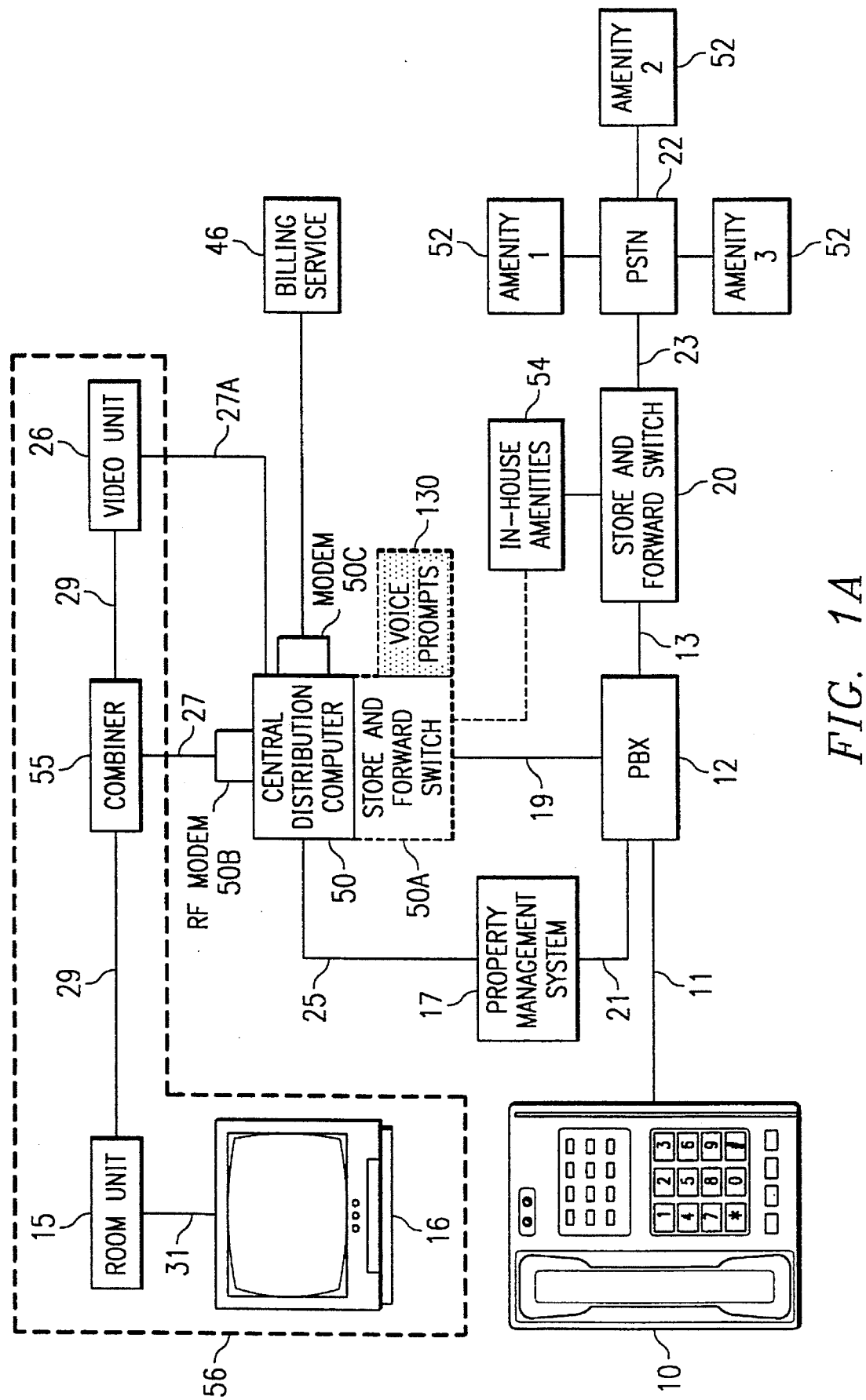
FIG. 1A illustrates an alternate embodiment of the access system of FIG. 1.

FIG. 1A illustrates a specific embodiment of FIG. 1 wherein the functions of a central distribution computer 50 and a store-and-forward switch 50A, which is identical to the store-and-forward switch 20, are combined onto a single platform and utilized to offer amenity services.

As will be described in detail with reference to FIG. 3, the access phone 10 typically comprises a standard telephone keypad, speed dial buttons, and a credit card reader, or swipe, mechanism. The access telephone 10 also has two light emitting diodes (LEDs). The access phone 10 is controlled by an internal microprocessor and the access phone 10's programs are stored on an Erasable Programmable Memory (EPROM). Characteristically, the access phone 10 is connected to the facility's PBX 12 via a standard twisted pair analog telephone line or a PBX telephone line 11. The access phone 10 communicates with the PBX 12 using Dual Tone Multi-Frequency (DTMF) signals. The PBX 12 has a plurality of trunk lines 13 connected to a store-and-forward switch 20 or directly to the public switched telephone network (PSTN) 22. In addition, the PBX 12 has a plurality of dedicated telephone lines 19 connected to the store-and-forward switch 50A. The PBX is also connected to a property management system 17 via a line 21.

As in FIG. 1, the store-and-forward switch 20 is connected to the public switched telephone network (PSTN) 22 with standard business trunks 23 supplied by the local telephone operating company. In this embodiment, the primary function of store-and-forward switch 20 is to perform the functions necessary for the automated operator service provider (OSP) services. In addition, as subsequently described in further detail, the store-and-forward switch 20 has the capability of processing the billing for amenities 1, 2, and 3. These amenities are amenity services that are not provided by the facility. For example, amenity 1 could be a florist; amenity 2 could be a travel agency; and amenity 3 could be a pizza delivery business. As described herein, the store-and-forward switch 20 also can be utilized to offer in-room amenities 54. In-room amenities 54 are services offered by the facility (e.g., room service). If the facility is not utilizing the store-and-forward switch 20 to perform automated OSP services, it may be unnecessary to have both store-and-forward switch 20 and store-and-forward switch 50A at the facility. Store-and-forward switch 50A is capable of performing the same functions for in-room amenities 54 and amenities 52 as is store-and-forward switch 20.

In this embodiment, the functionality of the store-and-forward switch 50A and the central distribution computer 50 are combined onto one computer platform. In another embodiment, the central distribution computer 50 and the store-and-forward switch 50A can reside as separate elements, in which case the store-and-forward switch 50A will have the same functionality as store-and-forward switch 20. Ideally, the central distribution computer 50 is a personal computer that utilizes a 386SX or 486SX computer processor chip and has enough random access memory and hard disk storage capacity to accommodate both audio and graphics capability (e.g., 8 megabytes of random access memory and a minimum of 89 megabytes of hard disk data storage capacity). In a preferred embodiment, the central distribution computer 50 utilizes UNIX System software and contains an interactive voice response circuit board (for generating voice prompts 130), such as a Dialogic voice board, a multi-channel graphics card (circuit board) for graphics transmission capability, and either a 2400 baud or 9600 baud data modem 50C that is connected to the public switched telephone network with a standard analog twisted pair telephone line. The graphics card could also be a custom-made circuit board, such as made by STB for Spectradyne, Inc. The software could contain off-the-shelf software, such as XWindows, that could be modified specifically for this application. Alternatively, the graphics capability could reside as a separate personal computer and could be connected to the central distribution computer via Ethernet or a similar computer network.

The central distribution computer 50 is also connected to a radio frequency (RF) modem 50B. Typically, the RF modem 50B comprises a RS 232 computer chip and an MK 20 transceiver card. The RF modem 50B receives RF input of 13 MHz and transmits RF output of 115.25 MHz over coaxial cable 27. If the RF modem 50B is a separate unit, it will have a serial port connection for linkage to the central distribution computer 50. The RF modem 50B allows the central distribution computer 50 to communicate over serial lines or "on-bus" or with modems (not shown) at the video unit 26 and the room unit 15. In one embodiment, the RF modem 50B converts standard RS 232 signaling into a proprietary broadband RF "polled protocol communication" to communicate with the video unit 26 and the room unit 15 over the standard coaxial cable 27, 28 and 29.

The store-and-forward switch 50A performs the same functions as the store-and-forward switch 20, described herein. The store-and-forward switch 50A receives information, in the form of DTMF signals, from the access phone 10 through the PBX 12. This information may include billing (e.g., credit or debit card information) and amenity location, i.e., room, identification information. As described in FIG. 1, the store-and-forward switch 50A can access a billing service 46, via the modem 50C and line 33, to determine whether the credit card is authorized for use. Line 33 can be a direct data line to the billing service 46 or can be a standard telephone line that accesses the public switched telephone network 22 via the PBX. The store-and-forward switch 50A can check the information it receives from the access phone 10 against an internal data base to determine which amenity is being accessed and whether the call originated from an authorized telephone. The store-and-forward switch 50A may also utilize the voice interactive capability of voice prompts 130 to offer amenity services to customers and respond to their replies, as well as assist with billing information input.

The central distribution computer 50 controls the operational functions of the video unit 26 and the room unit 15. The central distribution computer 50 monitors and controls the input and output signals from the video cassette players in the video unit 26 and controls when the movies begin to play. In addition, if the facility only bills customers that watch the movie longer than a preset length of time (e.g., ten minutes), the computer 50 continues to monitor the room unit 15, via the RF modem 50B, for message transfers, in order to determine which rooms to bill for pay-per-view movies. The computer 50 has graphics capability to transmit graphic screens, customized for the customer, to be broadcast onto the television 16. The graphics are used to help the customer utilize the amenity services and properly input the billing information.

In addition, information can be retrieved from the property management system 17 and formatted as a graphic screen for transmission to the customer's television set 16. The central distribution computer 50 formats the graphic screens in digital language, to display on television set 16, by gathering information from the property management system 17, the access phone 10, the billing service 46 (for invalid or unauthorized credit or debit cards), or from other sources. The digital graphic screens are converted to analog pictures (i.e., baseband video signals) in the graphics card and transmitted from the computer to the video unit 26 on coaxial cables 27A. At the video unit 26, the signals are modulated and combined onto coaxial cable 29 to be transmitted to the room unit 15 and the television 16. The transmission from the central distribution computer 50 includes the identification number of the room unit, that is based on a cross-reference of the identification number of the access phone 10, so that only the appropriate customer is able to receive the broadcast. A data base in the central distribution computer 50 contains a cross-reference of the corresponding identification numbers of the access phone 10 and the room unit 15.

Alternatively, the graphics processor of the computer 50 transmits the graphic screen images, customized for the customer, in a digital format to the video unit 26 where the images are converted to an analog format (broadband video), modulated to the appropriate frequency and transmitted to the television 16. Transmission from the central distribution computer 50 to the video unit 26 can occur in digital format using RS 232, over coaxial cable 27a, or in analog format using RF signaling. The transmission facilities can be directly linked to the video unit 26 or can be connected to a combiner 55. If connected to a combiner 55, the transmissions to the video unit 26 must contain an identification number corresponding to the video unit 26. It should be understood that the television 16, room unit 15, combiner 55 and video unit 26, as well as a head end (not shown) comprise a pay-per-view system 56.

The central distribution computer 50 stores the billing information or can input the room charge information into the property management system 17 (if a system 17 is located at the facility), or can print the bill using a printer (not shown). If billing information is stored, the central distribution computer 50 can make the billing data accessible, via the modem 50C, to an off-premises service provider that will authorize and process the billing data at a later time. This method is often referred to as "post-validation." The central distribution computer 50 also controls diagnostic functions for the video unit 26 and the room unit 15.

The central distribution computer 50 can be connected to the facility's property management system 17 with a standard asynchronous serial port and communicate with standard digital RS 232 signaling. Typically, for small facilities, the property management system 17 is a personal computer. Larger facilities utilize mini-computers, such as the IBM AS400. Among other uses, the property management system 17 maintains a customer "portfolio" that lists services utilized by the customer, the corresponding charges, and the total bill due on check-out. The billing service 46 is described in detail with reference to FIG. 1.

The combiner 55 is a unit that is utilized to combine the various RF signals from numerous sources onto one coaxial cable. In the illustrated embodiment, the combiner 55 combines signals from central distribution computer 50, the video unit 26, and the head end (not shown), which transmits standard broadcast television stations and cable television stations to the television 16. Combiner 55 units are readily available and manufactured by companies such as Macom, Inc.

In the illustrated embodiment, the video unit 26 may comprise a plurality of video cassette players, a plurality of cassette player controllers, frequency modulators, and a diplexer. If the central distribution computer 50 transmits the graphics screens over line 27a in a digital format, the video unit 26 also comprises digital to analog signal converters. If the video unit 26 enables a consumer to choose a movie for immediate viewing (i.e., "on-demand"), the unit 26 could include a robotic device to remove the selected video tape from a storage rack and place it in an appropriate video cassette player. However, for a scheduled pay-per-view movie service, the cassette players are pre-loaded with a pre-selected video cassette tape. The video cassette player is a standard video cassette tape player, such as the type manufactured by Sony Corporation. Typically, pay-per-view movies are shown at pre-programmed (i.e., scheduled) times and more than one room unit can access any one movie transmission. However, the video unit 26 can be constructed in such a manner that the movie is transmitted from a video cassette player to only one room unit per broadcast. Cassette player controllers (not shown) function as interface devices for enabling the central distribution computer 50 to control the video cassette players. Frequency modulators (not shown) modulate video and audio signals from the video cassette players into RF signals for transmission to a diplexer that functions as a band splitter and router. From the diplexer, the RF signals proceed through the combiner 55 and then through a facility distribution system (not shown) to the individual room units. Digital-to-analog signal converters (not shown) receive digital transmissions of graphic screens from the central distribution computer 50, store the transmissions in digital format, and then convert them into analog signals. The digital-to-analog signal converters also enable the video unit 26 to receive digital video signals from digital video servers (not shown), convert the signals to analog format and transmit them to the television 16. It is believed by the industry that, in some instances, off-premises digital video servers, provided by telephone companies, cable television service providers or other entities, will displace the traditional analog video cassette players.

Typically, the video tape players, cassette player controllers, frequency modulators, splitter/combiners, and diplexer are housed in video racks (not shown) in the video unit 26. The central distribution computer 50 is connected to the cassette player controllers, the splitter/combiners and the diplexer with coaxial cable 27. The central distribution computer 50 communicates with the video unit 26 via the RF modem 50B. Alternatively, the video unit 26 also can contain a video switching device (not shown) that will allow a movie or graphic screen to be switched onto an individual coaxial line 29 to a specific room unit 15. Currently, the transmission from the central distribution computer 50 includes a room unit identification number which enables the transmission to be received only by the designated room unit(s).

The room unit 15 is a self contained unit that can have two or more buttons to control reception of the broadcast programs. Typically, each unit 15 has been programmed with a unique room unit identification number. The room unit 15 can be situated near the television 16, built into the television chassis or mounted on the wall as a "smart-tap." The television 16 is a standard television set. The room unit 15 functions as an interface between the video unit 26 and the television 16. Program signals from the pay-per-view movies or from standard television programming (including cable television) are received by the room unit 15. The room unit 15 is connected to the video unit 26 and the television 16 by a standard coaxial cable 29. The room unit 15 transmits and receives frequency-shift-keying (FSK) signals having a 75 kHz shift over the coaxial cable 29 at a non-interfering frequency. The central distribution computer 50 is connected to and communicates with the room unit 15 through the combiner 55 and through the video unit 26.

For example, assuming a customer uses the access phone 10 to view a pay-per-view movie, the customer takes the access phone 10 off-hook and passes a credit card through the credit or debit card reader (card swipe) or manually enters the card information using the telephone keypad 56. The access phone 10 collects the card number and expiration date. Alternatively, the use of the card reader by the customer can be postponed until after the customer has selected the movie. The customer then presses the amenity button marked MOVIES. The access phone 10 dials the extension of the store-and-forward switch 50a through PBX 12. If the facility does not have a PBX, then the access phone 10 dials the store-and-forward switch 50A through the central office of a local telephone company. After receiving an acknowledgment signal from the store-and-forward switch 50A that the call has been received, the access phone 10 transmits the identification number of the phone 10, the credit card number, and the credit card expiration date to the switch 50A. The access phone 10 may also transmit the telephone number of the selected amenity service, especially if the amenity is offered by an amenity 52 service provider.

The store-and-forward switch 50A records the identification and billing information transmitted by access phone 10 and validates the billing data by checking that the credit card has not expired, that the account number is an appropriate format (e.g., has the appropriate number and type of characters), and that the card is of a type which is accepted by the facility. As in FIG. 1, the billing data may be further validated and authorized by the switch 50A transmitting an authorization request to a billing service 46, via the modem 50C, to query whether the credit card is a valid card. The billing service 46 returns an authorization code to the switch 50A to indicate the validity, or invalidity, of the card. Authorization of the card before the transaction is referred to as "pre-validation." The store-and-forward switch matches the access phone 10 identification number to the room unit 15 identification number.

The store-and-forward switch 50A responds by using the voice prompts 130. Likewise, the central distribution computer 50 queries the appropriate room unit 15 (based on the identification number transmitted by the access phone 10) to determine whether the television is turned on and the room unit 15 and the television 16 are tuned to an appropriate channel for receiving and displaying graphic circuit user prompts to be broadcast on the television 16. If not, the computer 50 tunes the room unit 15 to an appropriate channel for receiving the transmission and the customer is prompted, using audio voice prompts generated by the switch 50A, to turn on or tune the television 16 to an appropriate channel.

If the customer has not yet entered billing data via the card reader, the voice prompts and the graphic user prompt screens can be used to request that the customer do so by transmitting instructions such as, "Please insert your credit card into the credit card reader now." DTMF tones from the access phone 10 are received by the voice prompt unit 130, converted to a digital graphic image by the central distribution computer 50, then transmitted to the television 16 as analog signals. After inputting the credit card, the customer would see the credit card number and the expiration date on the screen of the television 16. Additional voice prompts would be transmitted back to the access phone 10 while the printed message would be transmitted to the television 16. The voice prompts 130 also can be used to explain how to use the access phone 10 to select a movie and to list the available movies or ask the customer to read the list from printed material in the room or from the graphic transmitted to the television set 16. The customer may then respond to the voice prompts and graphic user prompts by pressing appropriate keys on the telephone keypad, causing DTMF signals to be generated. The generated signals are received by the store-and-forward switch 50A, which causes additional prompts and graphics to be transmitted as needed.

The central distribution computer 50 controls when the movies start playing by signaling the cassette player controllers, which then signal the appropriate cassette player to begin transmitting the movie. The movie transmission is modulated to the frequency of the appropriate channel. In addition, by using the room unit identification number, the central distribution computer 50 can enable the appropriate customers' room units to receive the transmission. Once the signal is modulated, the movie is transmitted to the room unit 15 and, in turn, to the television set 16.

Because the computer 50 and the switch 50A can be connected to the property management system 17 via a line 25, the central distribution computer 50 and the access phone 10 may be used to offer additional amenity services. For example, the access phone 10 can have an amenity key for enabling a user to review and pay a hotel bill from the room. When the key is pressed, the access phone 10 is connected to the central distribution computer 50, which in turn is connected to the property management system 17 and receives the billing data output from the system 17 based on the identification code of the access phone 10. The central distribution computer 50 formats the billing data onto a graphic user prompt screen and transmits it to the television set 16 in the room corresponding to the identification code of the access phone 10 via the appropriate room unit 15. The customer then has the option of paying the displayed bill using the card reader 62 or the keypad 56 on the access phone 10. The billing data can be saved on the central distribution computer 50 so that the central distribution computer 50 can inform the property management system 17 whether the bill has been paid.

Figure 2:
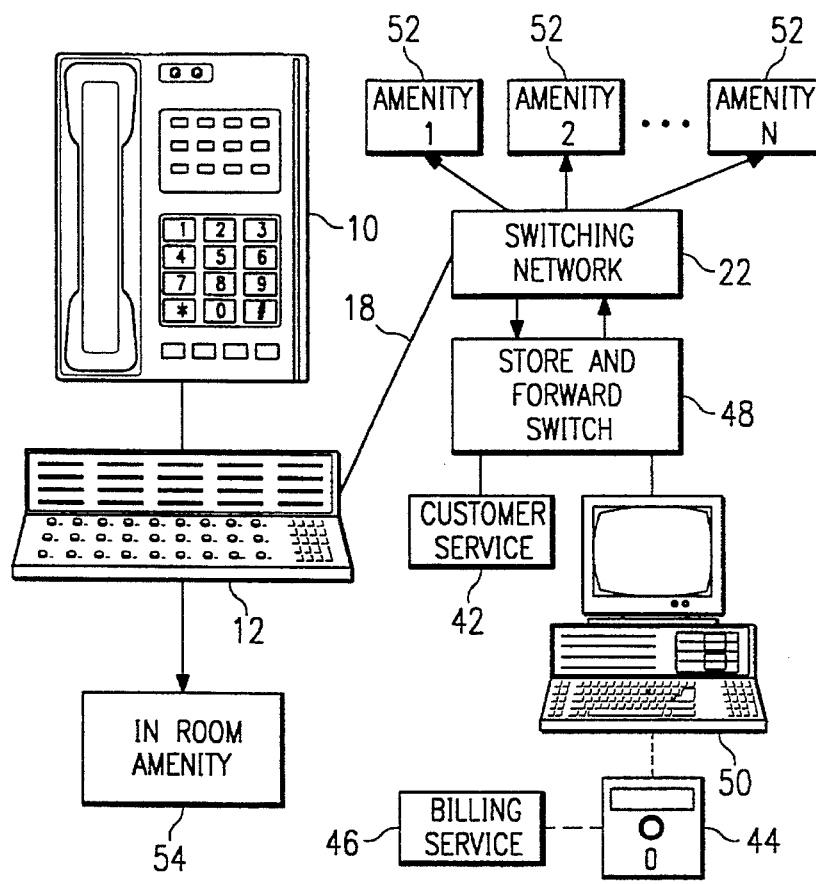
FIG. 2 illustrates an alternate embodiment of the system of FIG. 1, wherein the store-and-forward switch is disposed on a public switched telephone network.

Referring now to FIG. 2, there is illustrated a more detailed block diagram of an alternate embodiment wherein a store-and-forward switch 48, similar to the store-and-forward switch 20, is disposed on the switching network 22. In this embodiment, the access phone 10 accesses the switching network 22 through the PBX 12 and associated trunk line 18. A call is placed by the access phone 10 to a telephone number associated with the store-and-forward switch 48 in order to place a call thereto through the switching network 22. In this operation, the selection of an amenity by the access phone 10, as will be described hereinbelow, results in the telephone number of the store-and-forward switch 48 being dialed out to the switching network 22. When a connection is made, the message is transmitted from the access phone 10 to the store-and-forward switch 48 in a similar manner to that described above with reference to FIG. 1. The store-and-forward switch 48 has associated therewith a computer 50 that has memory and various other peripheral units associated with a personal computer. The computer 50 has an operating program that allows the store-and-forward switch 48 to be operated in accordance with the present invention. In this embodiment, it is possible to access various amenities 52 disposed on and accessible through the switching network 22, which amenities 52 are similar to amenities 24–40.

In one aspect of the present invention, some in-room amenities 54, such as television, in-room refreshment centers, etc., are provided. The access phone 10 provides a means by which a particular amenity can be accessed indirectly and also a means by which billing for the amenity can be done outside of the facility. In operation, the user selects the amenity, such as the in-room amenity 54 using the telephone 10. This information, associated credit card information, room number and other relevant information are forwarded to the store-and-forward switch 48. The store-and-forward switch 48 validates the credit card number by accessing a separate database, such as the billing service 42 of FIG. 1, through a direct line and then going through a procedure to activate and monitor the in-room amenity 54. This can be done in a number of ways. First, a separate one of the amenities 52 could control the in-room amenity 54 and it would only then be necessary to call this amenity 52 and route the access phone 10 to the amenity 52. The user at the access phone 10 would then input various key depressions in response to audio voice prompts. This would allow the user to select, for example, a movie. The amenity 52 would then initiate activation of the in-room amenity 54. This could be done remotely by a call to the hotel facility to activate the amenity, or some other way.

Another method for activating an in-room amenity is for the store-and-forward switch 48 to collect prompt information from the access phone 10 and then initiate a routine wherein it activates the in-room amenity 54 itself. For example, if the in-room amenity 54 were a television that offered movies, a central distribution box, such as the computer 50, could be located in the hotel establishment. The store-and-forward switch 48 could access this central distribution box through an extension 12a on the PBX 12 and route the appropriate information therethrough. In this manner, billing and other information may be stored at the store-and-forward switch 48 through use of the computer 50 and then the in-room amenity 54 activated. In one embodiment of the central distribution computer 50, the identification of each available movie, the viewing price, and payment authorization information are stored. In another embodiment, movie identification, the viewing price, and the payment authorization information are also stored on voice prompts 130, discussed herein.

When accessing any of the amenities, the access phone 10 generates a calling string. As will be described hereinbelow, the calling string is comprised of the number of the store-and-forward switch 48, followed by an authorization code to inform the store-and-forward switch 48 as to the origination information of the phone, which is utilized to indicate to the store-and-forward switch 48 that the access phone 10 is authorized to operate on the system. Thereafter, relevant message information is transmitted indicating the amenity that is desired, what type of information is desired from the amenity, etc. Typically, the calling string is generated by a group of separate software macros, which macros can be assembled in any manner. For example, if a user wanted a facsimile to be sent to the hotel as part of the amenity, a macro would be incorporated into the software to generate message information providing information as to the user's location and a fax number at a destination location. Thereafter, when the call is connected to the amenity, this information is sent to the amenity in association with connection of the user's phone to that amenity.

Further, the macros could be assembled in the software to generate a message such that an amenity could be accessed with all of the pertinent information being transmitted to the amenity without the need to actually connect the user's access phone 10 to the amenity. For example, if the user was ordering a service such as newspaper delivery to the user's room, all relevant information could be programmed into the access phone 10 and associated with one of the amenity keys. When the user depressed this key, the user's credit information in association with his authorization code would then be forwarded directly to the store-and-forward switch 48. Once validated, the following message information would contain everything necessary to be transmitted to the amenity by the store-and-forward switch 48 without need for the access phone 10 to actually be connected through the switching network 22 to the amenity 52. In another embodiment, before accessing the amenity 52, the store-and-forward switch can access the central distribution computer 50. The store-and-forward switch 48 has the capability to generate audio voice prompts and the central distribution computer has the capability to store and transmit graphic user prompt screens. Both the voice prompts and the graphic screens may be utilized to describe the variety of products available through the amenity. With the example described above, the voice prompts and/or the graphic screen could list the various newspapers available. The voice prompts and/or the graphic screens may also provide instructions for choosing the product, such as, "dial 1 for the New York Times." After a selection has been made, the store-and-forward switch 48 would store the selection information and the billing information. Product selection information also would be forwarded to the amenity 52.

In another embodiment, the functions of the store-and-forward switch 48 and the central distribution computer reside on a single computer platform, as illustrated in FIG. 1A (50 and 50A). Graphic screens, voice prompts, or both could be used to describe the product and facilitate product selection. The selection and billing information would be stored in the central distribution computer 50 and forwarded to the amenity. This could also be the situation with a movie order wherein a user could merely depress a key dedicated for a given movie or in-room amenity 54. It is only necessary for the user of the access phone 10 to be connected to the amenity if the amenity requires further information other than a standard template of information. Therefore, in this mode, the access phone is operable to generate a "packet" of information, which packet of information contains two types of routing information, routing information to the store-and-forward switch 48 (or to central distribution computer 50 and store-and-forward switch 50A) and routing information to the amenity, and also billing information. This information is self-contained and accessible by the user by depression of a single button, which depression results in the assembling of the message packet for transmission to the amenity through the store-and-forward switch.

Figure 3:
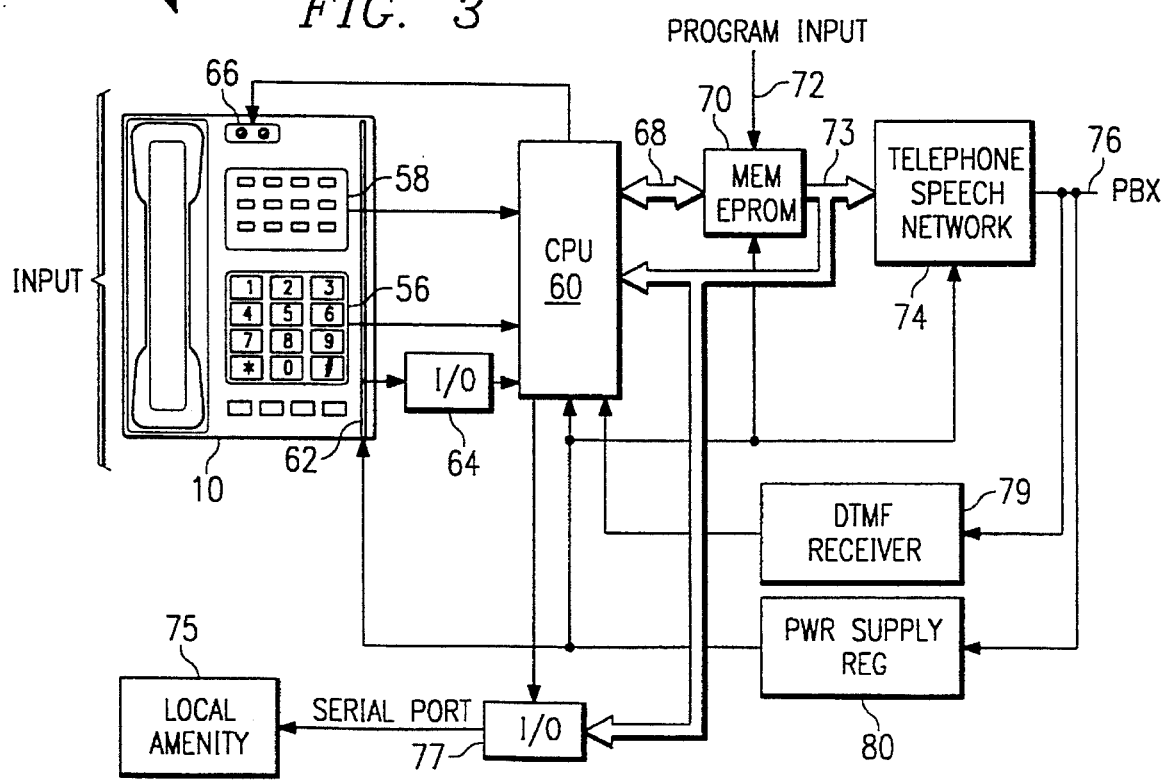
FIG. 3 illustrates a block diagram of a telephone of the access system of FIG. 1.

Referring now to FIG. 3, there is illustrated a schematic block diagram of the access phone 10. The access phone 10 includes a normal telephone keypad 56 having twelve buttons thereon. In addition, an amenity keypad 58 is provided that has a plurality of buttons, each button operable to select a particular amenity. A central processing unit (CPU) 60 is provided, which is a conventional microprocessor of the type G655C151 manufactured by SMD and which is operable to receive as inputs DTMF signals generated when the buttons on the amenity keypad 58 and the keypad 56 are depressed. In addition, a card reader 62 is provided which is interfaced through an 5/0 device 64 to the CPU 60. The card reader 62 is the type MCP571, manufactured by Neuron Corporation, which is a low power card reader having a current requirement of approximately 3 ma. CPU 60 is operable to read data input the card reader 62 when the card is swiped therethrough, and to control the general operation of the card reader 62. The CPU 60 also controls a display device 66 which comprises two Light Emitting Diodes (LEDs). The CPU 60 is interfaced through a system bus 68 to a nonvolatile memory 70. In the preferred embodiment, the memory is configured with an Erasable Programmable Memory (EPROM) of the type 27C256 which is a CMOS 32 k×8 250 ns EPROM. The EPROM 70 contains the various programs and is programmable through a program input 72. The CPU 60 is operable to address predetermined locations in the memory for output on a data bus 73 to a telephone speech network 74 (balance network), which is commercially available from Motorola Corporation as Part No. MC34014. The network 74 is operable to generate the DTMF signals for output to the PBX main line 76, which represents a four-line telephone access.

The CPU 60 also interfaces with a local amenity 75 through the data bus 73, which data bus 73 is connected through a 1/0 device 77 to provide a serial output port to the local amenity 75. The local amenity 75 is essentially an amenity that is located proximate to the access phone 10. The CPU 60 is operable to receive data from phone line 76 through a DTMF receiver 69, the output of which is connected to the CPU 60. The DTMF receiver 79 is operable to receive tones from a remote location through the phone line 76, decode the received tones and output serial data to the CPU 60, which data contains information that can be converted into data on the data bus 73 for output through the I/O 77 to the local amenity 75. Further, the data output of the DTMF receiver 76 could be directly throughput the I/O 77 to the local amenity 75. This allows a remote location to communicate directly with the local amenity 75. Further, the DTMF receiver 79 allows acknowledgment tones and the like to be returned to the CPU 60, thus providing a two-way communication link.

The four-line telephone line 76 has contained thereon the conventional forty-eight volt level provided by the telephone company. This is input to a power supply regulator circuit 80 to regulate the forty-eight volts down to a voltage of approximately twelve volts to provide a supply voltage. The regulator circuit is embodied as a part of the speech network 74. The twelve volts is input to the card reader 62, the CPU 60, the memory 70 and the telephone speech network 74. The overall access phone 10 draws approximately seventeen milliamps.

In operation, whenever the access phone 10 is taken off hook, this is sensed by the telephone speech network and the system is activated. A card can then be "swiped" through the card reader 62 and the CPU 60 will determine if it is a "good" card; that is, whether the card can be read by the card reader 62. If so, the display 66 is manipulated to indicate such. Once a good indication is obtained by the user, one of the amenity keys on the keypad 58 can be depressed. The CPU 60 senses this key depression and then outputs the appropriate calling string from the memory 70 to the telephone speech network 76. This is converted to the appropriate DTMF signals for output to the PBX 76. The calling string essentially comprises the telephone number of the store-and-forward switch and an associated message. In the case where the facility has both a store-and-forward switch 20 and a store-and-forward switch 50A, telephone numbers for each are stored in memory 70. The CPU 60 distinguishes between amenities that use the store-and-forward switch 20 and store-and-forward switch 50A and outputs the correct data string to connect to the appropriate platform. The system then waits for connection with the amenity, as no further actions are taken by the access phone 10. If for some reason connection is not made to the amenity, a dial tone will be returned, or some similar type of tone. The access phone 10 is operable to receive acknowledgment tones from the store-and-forward switch 20 or 50A, which are utilized during transmission of the calling string, i.e., a pause is interposed between the dialed-out number of the store-and-forward switch, the transmission of user I.D. and authorization codes, and transmission of messages.

Figure 4:
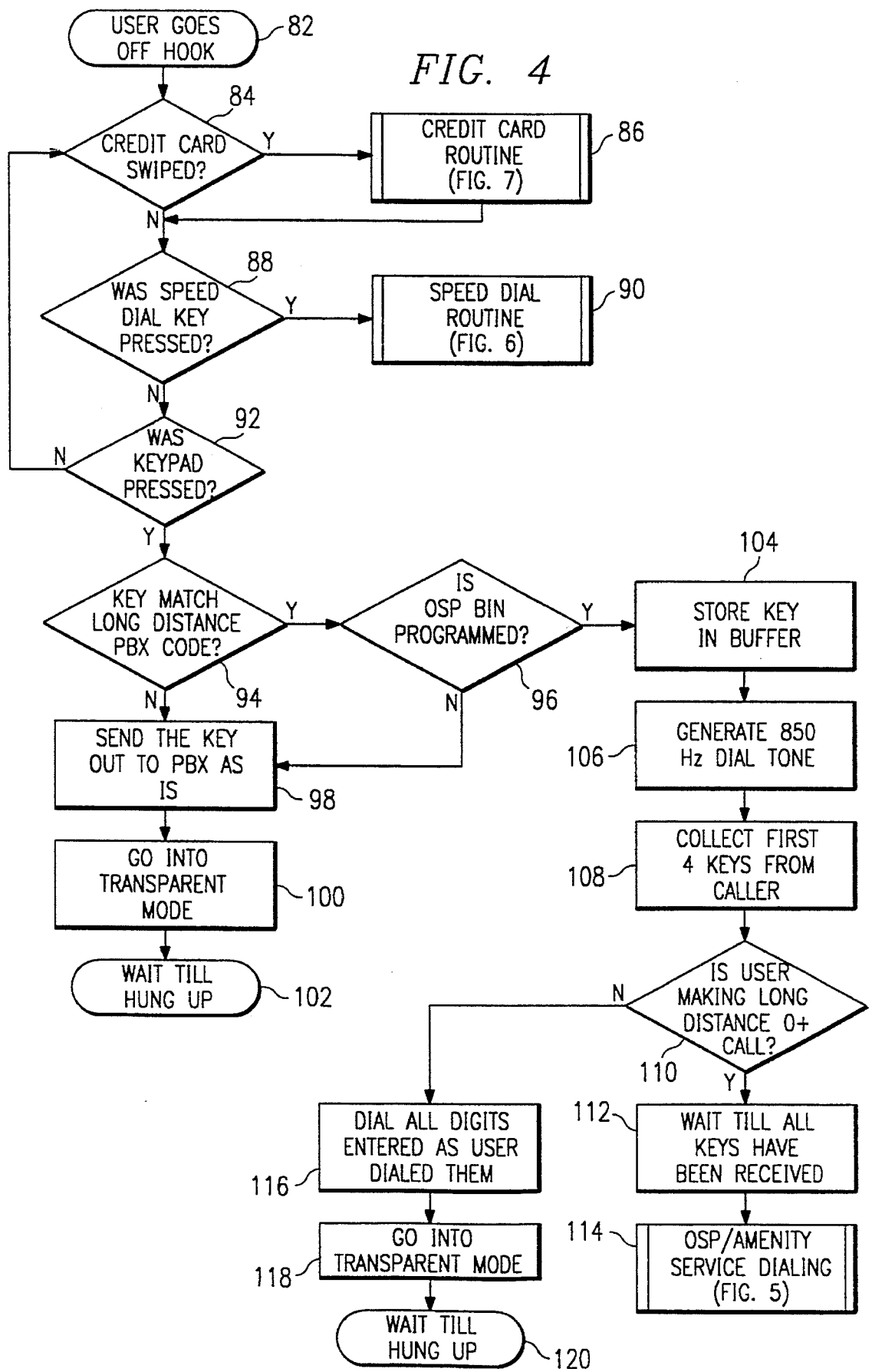
FIG. 4 illustrates a flow chart of the operation of the telephone of FIG. 3.

Referring now to FIG. 4, there is illustrated a flow chart for the overall operation of the access phone 10. Execution is initiated at a start block 82 wherein the user goes off hook. Execution then flows to a decision block 84 to determine if the credit card has been swiped through the card reader. If yes, execution proceeds along a "Y" path to a function block 86 to initiate a credit card routine (FIG. 7). If not, execution proceeds along an "N" path to the input of a decision block 88, the output of function block 86 also flowing to the input of decision block 88.

Figure 6:
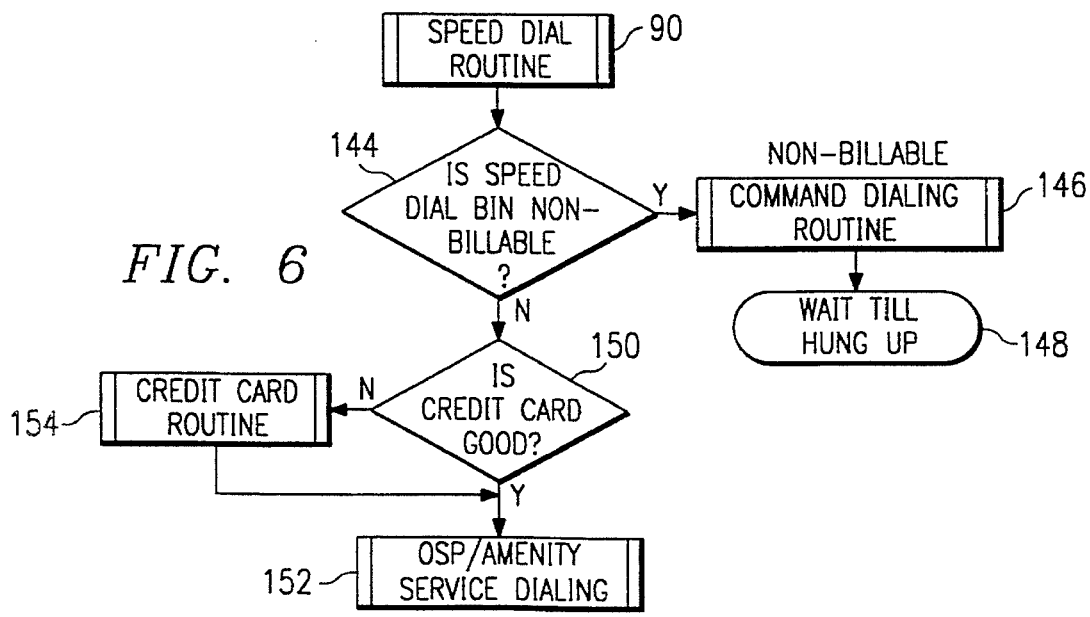
FIG. 6 illustrates a flow chart of a speed dial routine of the present invention.

At decision block 88, a determination is made whether a speed dial key has been pressed (the speed dial key being a standard feature of the telephone 10). If the speed dial key has been pressed, the program flows along a "Y" path to a function block 90 that indicates a speed dial routine (FIG. 6). The speed dial routine is one wherein a particular number has been predisposed in memory in accordance with the operation of a conventional phone. If the facility is utilizing both a store-and-forward switch 20 and a store-and-forward switch 50A, then, after the key is pressed, the pre-programmed number would direct the telephone call to the appropriate switch. For example, if the movie key is pressed, the access phone 10 would be connected to the store-and-forward switch 50A. If the speed dial key has not been pressed, the program flows along the "N" path to decision block 92 to determine if the regular telephone keypad 56 has been depressed. If not, the program flows along an "N" path back to the decision block 84 and, if it was pressed, the program flows along a "Y" path to a decision block 94. At decision block 94, a determination is made whether the key matches a long distance PBX code. If So, the program flows along a "Y" path to a decision block 96 to determine if the OSP buffer has been programmed. If it has not, the program flows along an "N" path to a function block 98 to send the key out to the PBX after it was pressed. The "N" path from the decision block 94 is also input to the function block 98. The program flows from the function block 98 into a function block 100 to go into a transparent mode and then to a block 102 to wait till the user goes back on hook.

If it was determined that the OSP buffer was programmed in decision block 96, the program would flow along a "Y" path to a function block 104 to store the key in a buffer. The program then flows to a function block 106 to generate the 350 Hz dial tone. The program then flows to a function block 108 to collect the first four keys from the caller and then flows to a decision block 110, where a determination is made whether the user is making a long distance 0+ call. If so, the program flows along a "Y" path to a function block 112 to wait until all the keys have been received, and then to a function block 114 representing the amenity service dialing routine, this being the selection of an amenity. However, if the user was not making a 0+ call, the program would flow along an "N" path form decision block 110 to a function block 116 to dial all the digits entered as the user dialed them and then to a function block 118 to go into a transparent mode. The program would then flow to a block 120 to wait until the user goes on hook.

Figure 5:
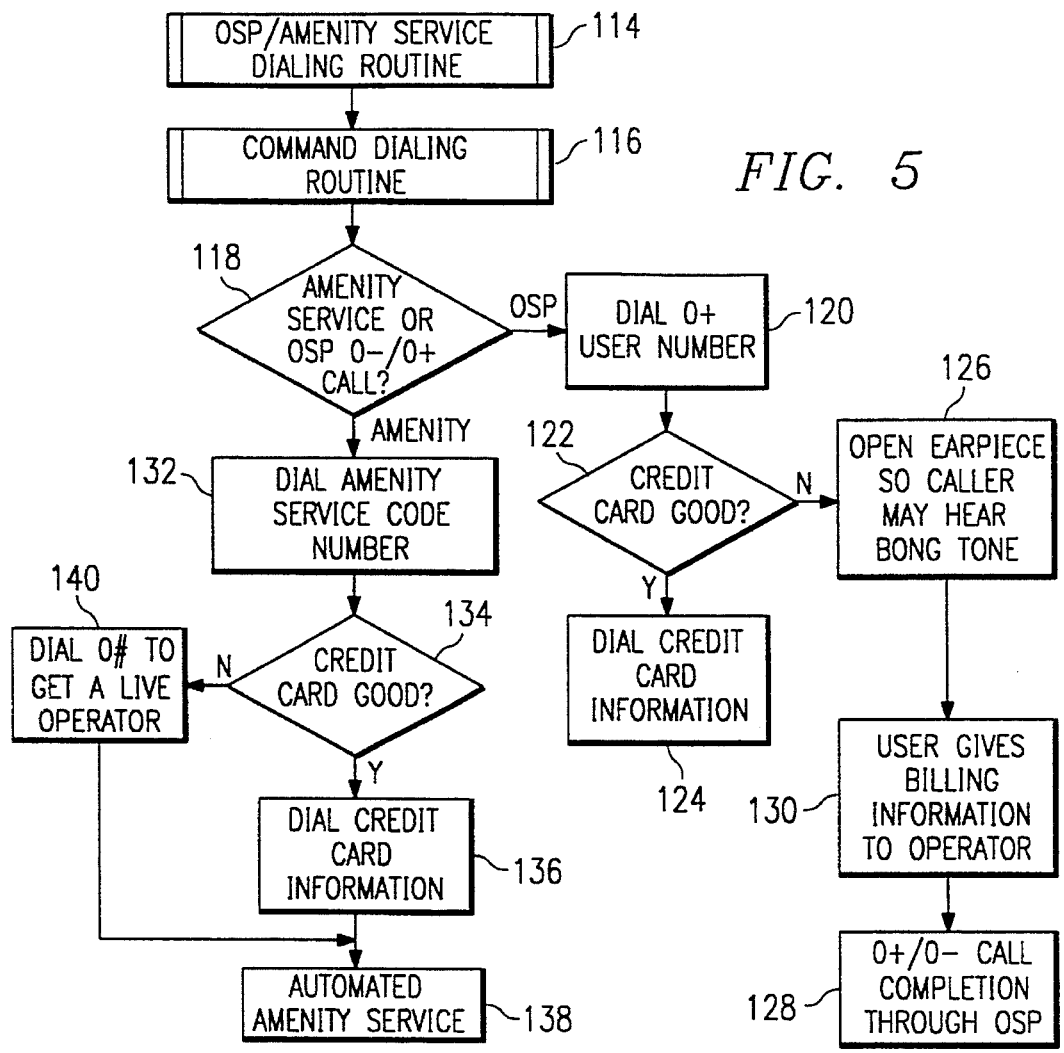
FIG. 5 illustrates a flow chart of an amenity service dialing routine of the present invention.

Referring now to FIG. 5, there is illustrated a flow chart for the amenity dialing routine 114. The program would flow from the function block 114 to a function block 116 to initiate a command dialing routine, which would create a calling string. The program would then flow to a decision block 118, where a determination is made whether an amenity service or a 0–/0+ call was being made. If it is an OSP (Operator Service Provider) number, the program flows to function block 120 to dial a "0" followed by the user number. The program then flows to a function block 122, where a determination is made whether the credit card was good and, if so, the program flows along a "Y" path to a function block 124 and, if it was not good, the program flows along an "N" path to a function block 126 to open the earpiece so that the caller may hear a tone. After the credit card information is dialed in the function block 24, the program flows to a function block 128 wherein the call completion is made through the OSP. The function block 126 also flows to the function block 128 through a function block 130 wherein the user provides billing information to the operator.

If an amenity was selected by the decision block 118, the program would flow to function block 132 to dial the amenity service code number, which is a predetermined code associated with each amenity. The program would then flow to a decision block 134, where a determination is made whether the credit card was good. If so, the program flows along "Y" path to a function block 136 to dial the credit card information and then to function block 138 for the automated amenity service. If the credit card were not good, the program would flow from the decision block 134 along an "N" path to a function block 140 to obtain a live operator and then to the automated amenity service block 138.

Referring now to FIG. 6, there is illustrated a flow chart depicting the speed dial routine 90. The program flows from the function block 92 to a decision block 144, where a determination is made whether the speed dial buffer was nonbillable. If it is, the program flows along a "Y" path to a function block 146 to initiate the dialing command routine and then to a block 148 to wait until the user has gone on hook. If the speed dial buffer is nonbillable, the program flows along an "N" path to a decision block 150, where a determination is made whether the credit card is good. If so, the program flows along the "Y" path to a function block 152, which is a credit card routine, and then to the function block 152.

Referring now to FIG. 7, there is illustrated a flow chart for the credit card routine 86. The program flows from the function block 86 to a function block 156 to set a timeout value for the credit card reader. Once the timeout value has been set, the program flows to a function block 158 to turn on one of the LEDs in the display 66 that is a green color such that it flashes. This indicates to the user that he is to swipe his credit card through the credit card reader 62. The program then flows to a decision block 160, where a determination is made whether the card was swiped. If yes, the program flows to a function block 162 to perform a parity check on the card. The program then flows to a decision block 164, where a determination is made whether the card was good. If yes, the program flows along a "Y" path to a function block 168 to turn the green LED on to a solid color. The program then flows to a function block 170 to indicate that the credit card was good and then back to a return block 172.

If the card has not been swiped at the decision block 168, the program flows along an "N" path to a function block 174 to turn off the green LED and then to a function block 176 to indicate that the credit card is not good, i.e., that it would not read properly. Then the program flows to the return block 172. This is also the case if the credit card had been determined not to be good, wherein the program would flow from the decision block 164 along an "N" path to the input of function block 174. In addition, if the card cannot be read properly or if the credit card is determined not to be good, the customer can be notified with voice prompts and graphic screens.

Figure 8:
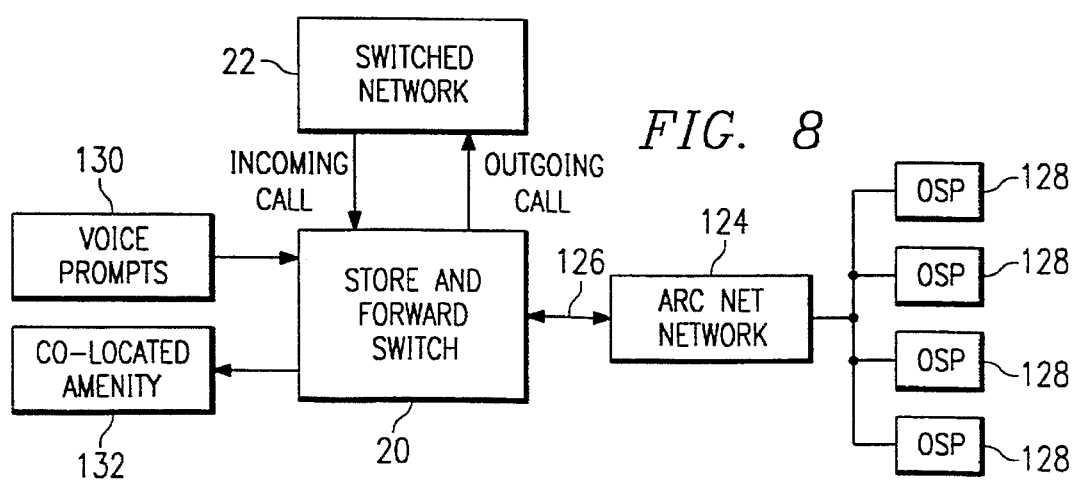
FIG. 8 illustrates a block diagram of the store-and-forward switch of FIG. 1.

Referring now to FIG. 8, there is illustrated a block diagram of the store-and-forward switch 20. It is understood that this same block diagram may be used to illustrate the store-and-forward switches 48 and 50A as well. The store-and-forward switch 20 is operable to receive an incoming call from switched network 22 and also place an outgoing call from the switch 20 to switched network 22. The store-and-forward switch 20 has associated therewith an ARCNET network 124. The ARCNET network 124 interfaces with the store-and-forward switch 20 through a serial port 126. The network 124 is operable to connect a plurality of operator terminals 128 with the store-and-forward switch 20. This is a conventional interconnection utilizing a local area network (LAN) in the form of the network 124.

The store-and-forward switch 20 also has interfaced therewith a voice prompt system 130. The voice prompt system 130 is essentially a Voice Messaging system that provides the capability to generate voice messages that are prerecorded in a digital form. As an alternative to forwarding a telephone call to an off-premises amenity, the voice prompts can be used to describe the various products available through the amenity. The prompts can also describe how to purchase a particular service. For example, if a food service is desired, voice prompts can list the menu, explain what number to dial in order to receive the desired meal, and tell the customer to pay for the meal by utilizing a credit card and the card reader. Voice prompts also can be used to ask customers if they would like to access the graphic screens for a particular amenity. If the response is affirmative, the store-and-forward switch transmits a signal to the central distribution computer 50 requesting that the appropriate graphic screens be transmitted to the customer's television set. For example, if a customer pushes the florist amenity button, a voice prompt may ask him to dial a number if he wishes to view the discounted floral arrangements on the television set. If so, the appropriate graphic user prompt screen is transmitted to the television set. The customer can purchase the arrangement, responding to the screen, by dialing the appropriate numbers on the access phone.

In addition, a co-located amenity 132 is provided that is interfaced with the store-and-forward switch 20. This co-located amenity is identical in form to the amenities 52 and allows the store-and-forward switch 20 to interface with the amenity 132 through the switched network 22 directly with the access phone 10 without placing an outgoing call. In this manner, the call processing features of the store-and-forward switch 20 can be performed without placing an outgoing call, but the co-located amenity 132 is still connected to the access phone 10, similar to that chart described above with reference to FIGS. 1 and 2.

Figure 9:
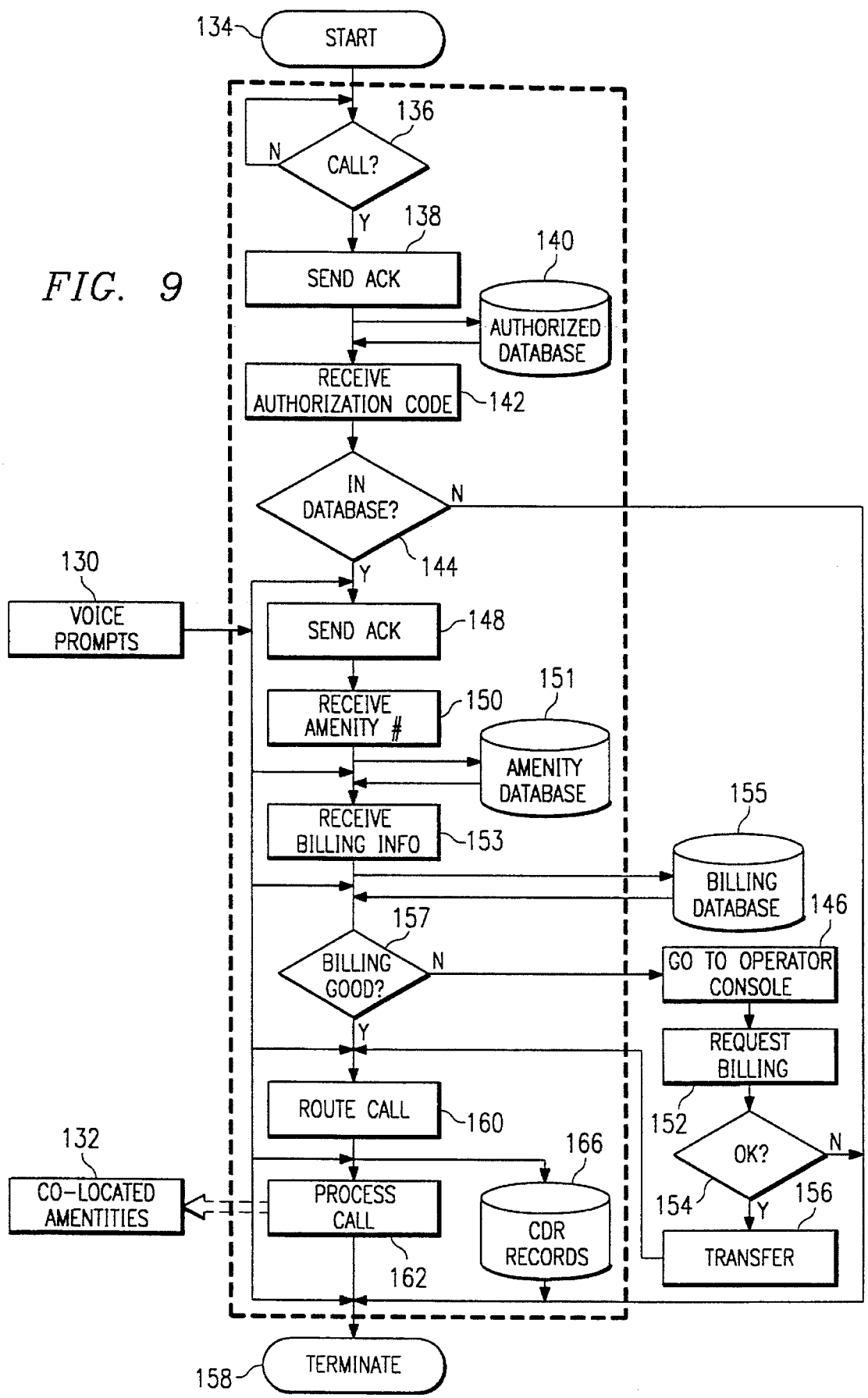
FIG. 9 is a flow chart of the operation of the store-and-forward switch.

Referring now to FIG. 9, there is illustrated a flow chart for the operation of the store-and-forward switch 20. In general, the switch 20 has the operations thereof disposed within a phantom line box and is initiated at a start block 134. The program then flows to a decision block 136 to determine if a call has been made. If not, it returns to the input until the call has been received. When a call has been received, the program flows to a function block 138 to send an acknowledgment signal. The program then flows to an authorized data base 140 which is accessed in order to determine whether an authorization code has been received. This is indicated by a function block 142 wherein the authorization code received from the access phone 10 is compared with the authorized database 140. If the authorization code is in the database, the program then flows along a "Y" path from a decision path 144. If the authorization code is not in the database, the program then flows along an "N" path to a termination block 158 to terminate the call.

If the authorization code is in the database, the program then flows along the "Y" path from the decision block 140 to a function block 148 to send a tone back to the unit. Voice prompts can also be returned to the access phone 10, which voice prompts were generated in the voice messaging system 130. The program then flows to a function block 150 to receive the amenity number.

After the amenity number has been received from the access phone 10, as indicated by the function block 150, an Amenity Database 151 is accessed for information regarding the amenity, such as routing information, processing information, etc. The program then flows to a function block 153 to receive the billing information after transmitting an acknowledgment tone to the access phone 10 that indicates receipt of the amenity number. A Billing Database 155 is accessed to validate the received billing information. Billing Database 151 is typically a direct line connection to a national clearinghouse that maintains a credit verification system. The program then flows to a decision block 157 to determine if the billing information was validated. If so, the program flows along a "Y" path to a function block 160 to route the call to the appropriate amenity. If the billing information was not validated, the program flows along the "N" path to a function block 146 to process billing information through the network 124 to request billing as indicated by function block 152 which, if approved by decision block 154, would result in transfer back to the input of function block 150 as indicated by function block 156. If not, the program would flow from the decision block 154 to a terminate block 158.

After the call has been routed, the store-and-forward switch 20 goes into a processing mode, as indicated by a function block 162. The processing function interfaces with Call Data Records (CDR) in a database 166 to provide timing information, billing information, origination information (i.e., the location of the access phone 10 from which the call was originated), etc. This information is stored until the call is terminated. When the call is terminated, the program flows from the function block 162 to the terminate block 158. Further, when the call is processed, the function block 162 indicates that the store-and-forward switch 20 can interface with the co-located amenities 132 to maintain information associated therewith. As described above, the store-and-forward switch performs a number of functions. First, it must process and store the billing information, which information is approved during the reading process, as indicated by a function block 160. Once the call has been approved from a billing standpoint, the call is then routed to the amenity, the billing information stored and the call timed. Therefore, the operator of the amenity will provide the amenity and not maintain any information as to billing, timing, etc. This is controlled by the store-and-forward switch 20 of the present invention.

Figure 10:
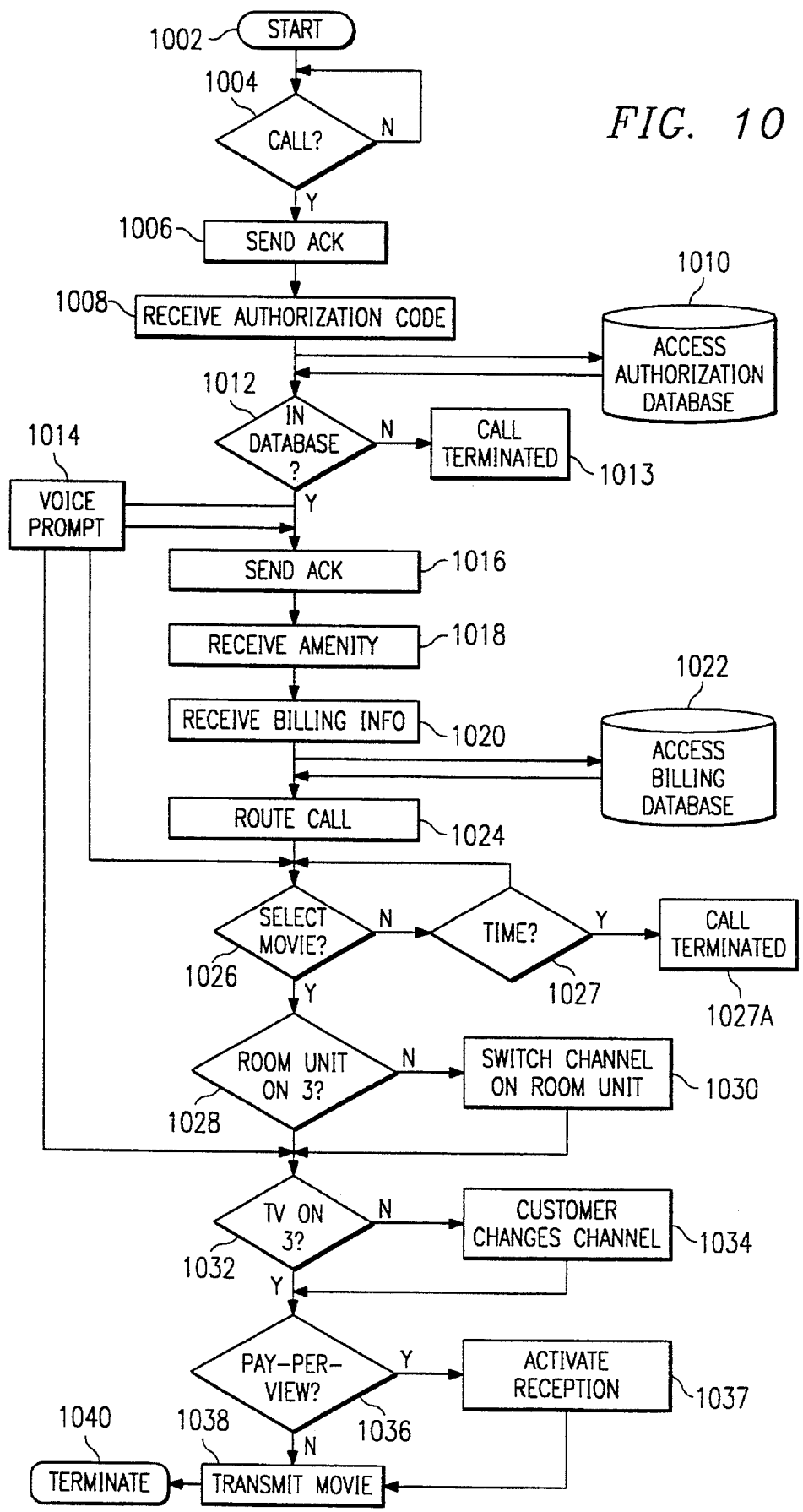
FIG. 10 is a flow chart of the operation of the store-and-forward switch when a movie is the selected amenity.

FIG. 10 illustrates a flow chart of the operation of the store-and-forward switch 20, 48 or 50A when a movie is the selected amenity. The flow chart of FIG. 10 illustrates the interaction of the access phone 10 and the store-and-forward switch 50A with the central distribution computer 50 to offer and provide an amenity, in this case a movie, to a customer.

Execution begins in step 1002 and proceeds immediately to step 1004. In step 1004, a determination is made whether a call from the access phone 10 has been received by the store-and-forward switch 20. If not, execution remains at step 1004 until a call is received. Once a call has been received, execution proceeds to step 1006, in which the store-and-forward switch 50A transmits a signal, such as a discrete dial tone, a non-standard DTMF signal, or a multifrequency (MF) signal, to the access phone 10 to acknowledge receipt of the call. Execution then proceeds to step 1008, in which a telephone identification number generated by the access phone 10 is received by the store-and-forward switch 50A. The telephone identification number also serves as an authorization code. In step 1010, the switch 50A accesses an authorization data base (not shown) and the telephone authorization code is compared with authorization codes stored in the data base. In step 1012, a determination is made whether the telephone authorization code matches one of the codes stored in the data base. If not, execution proceeds to step 1013 and the call is terminated. In this manner, customers can make arrangements with the hotel to prevent movies from being shown in their rooms by having the telephone identification code associated with the access phone 10 in their room removed from the authorization data base. A determination is also made as to the identification code of the room unit 15 that corresponds to the identification code of the telephone 10 so that the appropriate room unit can be contacted. It is understood that appropriate voice prompts 130 may be accessed and utilized to inform the customer that their access phone 10 is not authorized to access the amenity service.

If in step 1012 the telephone authorization code matches a code stored in the authorization data base, execution proceeds to step 1014. In step 1014, the voice prompts 130 are accessed. It is understood that the voice messaging system utilized to generate the voice prompts 130 may reside as an adjunct unit to or on a circuit board within the store-and-forward switch 50A. In step 1016, the voice prompts 130, which were accessed in step 1014, may be used to acknowledge that authorization is complete. Alternatively, in step 1016, a signal may be transmitted by the switch 50A to a LED on the display panel 66 of the access phone 10 to activate the LED as an indication that authorization is complete.

In step 1018, the amenity identification number, generated by the customer's pressing one of the amenity keypads 58, is received by the store-and-forward switch. It should be understood that if the switch is used to access only one amenity, such as movies, then the access phone 10 will not need to generate an amenity identification number and therefore, the switch 50A will not receive an amenity identification number. Assuming that an amenity identification number is received by the switch, an acknowledgment tone is transmitted by the switch 50A to the phone 10 to indicate receipt of the amenity number and concurrently, an amenity data base (not shown) is accessed by the switch to retrieve information regarding the amenity, such as routing information, processing information, etc. Execution then proceeds to step 1020.

In step 1020, billing information is received by the switch 50A from the phone 10. It is understood that billing information is entered by the customer by swiping a credit card through the card reader 62 of the phone 10, as described in detail with reference to FIG. 7, or by manually entering the dard information using the telephone keypad 56. In step 1022, the switch 50A accesses a billing data base (not shown) to validate the billing information. Alternatively, execution of steps 1020 and 1022 can be postponed until later in the routine, for example, subsequent to a customer's selecting a movie. Once obtained by the switch 50A, the billing information and the telephone identification number are stored on a hard disk of the central distribution computer 50 or store-and-forward switch 50A to be later retrieved for validation and processing. Validation of the billing information is described in detail with reference to steps 153–157 of FIG. 9 and will not be repeated here. If a computerized property management system, such as a property management system 17, is connected to the central distribution system 50, as shown in FIG. 1A, the customer may be given the choice of having the amenity charge placed on the room bill rather than being billed directly to the credit card. In this case, the telephone identification number and room charge information are sent directly to the property management system 17.

In step 1024, the switch routes the call to the appropriate amenity. In this case, because the amenity is a movie service, the call is routed to the central distribution computer 50. As previously indicated, the store-and-forward switch 50A and the central distribution computer 50 may comprise a single unit. Appropriate voice prompts 130 are accessed by the switch 50A to describe the amenity service to the customer. For example, the prompts 130 may be used to list the movies that are available for viewing and/or explain how to select a movie. In step 1026, a determination is made whether a predetermined time period for entering amenity selection information has elapsed. If the time period has elapsed, execution proceeds to step 1027a, in which the voice prompts 130 are disconnected from the phone 10 and a dial tone is generated as an indication that the call has been terminated. If in step 1027 the time period has not elapsed, execution returns to step 1026.

If in step 1026 the customer has selected a movie, execution proceeds to step 1028, in which the central distribution computer 50 queries the room unit 15 to determine whether the room unit 15 is tuned to a channel on which a movie can be received (usually channels 2 and 3). If the room unit 15 is not tuned to an appropriate channel, execution proceeds to step 1030, in which the computer 50 automatically switches the room unit 15 to the appropriate channel. Execution then proceeds to step 1032. If in step 1028 the room unit 15 is tuned to an appropriate channel, execution proceeds directly to step 1032.

In step 1032, the central distribution computer 50 queries the room unit 15 to determine whether the television 16 is turned on and tuned to a channel on which a movie can be received. If the television 16 is not turned on and/or tuned to an appropriate channel, execution proceeds to step 1034 and the voice prompts 130 are accessed to instruct the customer to turn on and/or tune the television 16 to an appropriate channel. Execution then proceeds to step 1036. If in step 1032 the television 16 is tuned to an appropriate channel, execution proceeds directly to step 1036.

In step 1036, a determination is made whether the movie is a "pay-per-view" type movie, i.e., it is broadcast at a preselected time to all customers who select to view that movie. If the movie is a pay-per-view movie, execution proceeds to step 1037, in which the room unit 15 is activated to receive the movie and execution proceeds to step 1038. If in step 1036 it is determined that the movie is not a pay-per-view movie, i.e., it is an "on-demand" type movie, which is shown immediately and only to the customer who selected it, execution proceeds immediately to step 1038. In step 1038, the movie is transmitted from the video unit 26 to the room unit 15 for viewing on the television 16 by the customer. Execution terminated in step 1040.

Figure 11:
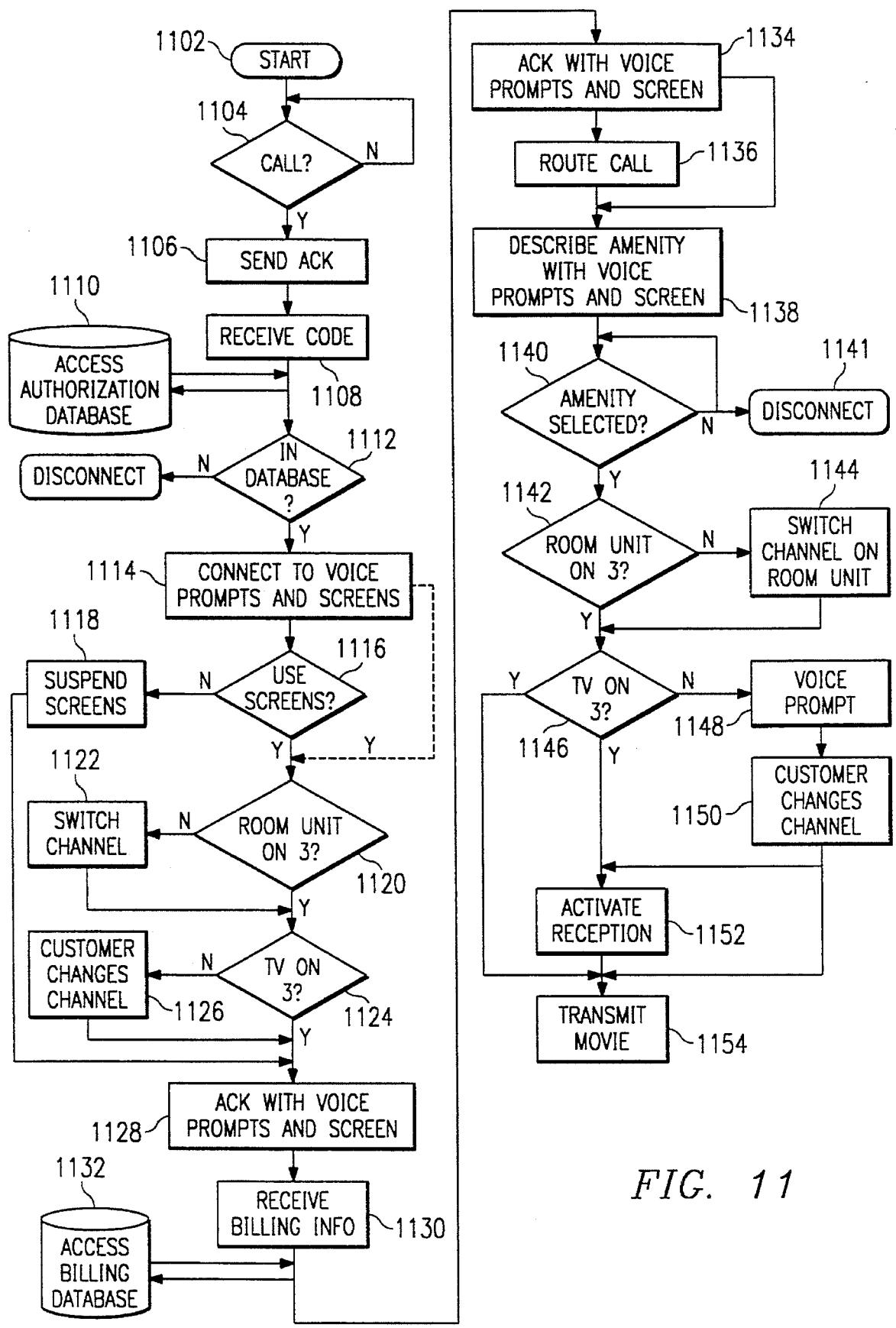
FIG. 11 is a flow chart of the operation of the store-and-forward switch illustrating the use of voice and graphic display prompts to offer an amenity to a user.

FIG. 11 is a flow chart illustrating the operation of the store-and-forward switch when voice prompts 130 and graphic screens are utilized to offer an amenity to the customer. Execution begins at step 1102 and proceeds immediately to step 1104, in which a determination is made whether a call from the access phone 10 has been received by the store-and-forward switch 50A. If not, execution remains at step 1104 until a call is received. Once a call has been received, execution proceeds to step 1106, in which the store-and-forward switch 20 transmits a signal, such as a discrete dial tone, a non-standard DTMF signal, or a multifrequency (MF) signal, to the access phone 10 to acknowledge receipt of the call.

Execution then proceeds to step 1108, in which a telephone identification number generated by the access phone 10 is received by the store-and-forward switch 50A. The telephone identification number also serves as an authorization code. In step 1110, the switch 50A accesses an authorization data base (not shown) and the telephone authorization code is compared with authorization codes stored in the data base. Likewise, in step 1110, once an amenity key has been pressed and an amenity number generated, an amenity data base (not shown) may be accessed to retrieve information about the amenity, such as routing information, processing information, which graphic screens and/or voice prompts should be utilized in offering the amenity to the customer, etc. In step 1112, a determination is made whether the telephone authorization code matches one of the codes stored in the authorization data base. If not, execution proceeds to step 1113 and the call is terminated. A determination is also made of as to the room unit identification code that corresponds to the telephone identification code so that the corresponding room unit can be connected. It is understood that appropriate voice prompts 130 may be accessed and utilized to inform the customer that their phone 10 is not authorized to access the amenity service.

If in step 1112, the telephone authorization code matches one of the codes stored in the authorization data base, execution proceeds to step 1114. In step 1114, both voice prompts 130 and graphic screen capability are accessed. The voice prompts are utilized to prompt the customers to indicate whether they wish to view amenity instructions on the television 16 screen via graphic screens by pressing certain keys on the keypad 56. In this manner, the customer is given the option of continuing to watch television programming while requesting an amenity or using the television screen as a guide to assist in requesting an amenity.

In step 1116, a determination is made whether the customer has indicated a desire to view the graphic user prompt screens, if not, execution proceeds to step 1118, in which use of the graphic screens is suspended. Execution then proceeds to step 1128. If in step 1116, it is determined that the customer has indicated a desire to view the graphic screens, execution proceeds to step 1120. It is understood that steps 1116–1118 may be eliminated so as not to give the customer a choice regarding whether to view the graphic screens. In that case, execution would proceed immediately from step 1114 to step 1120 as indicated by the dashed line therebetween.

In step 1124, a determination is made whether the television 16 is turned on and tuned to an appropriate channel for viewing the graphic screens (again, usually 2 or 3). If not, execution proceeds to step 1126, in which the voice prompts may be accessed and utilized to prompt the customer to turn on and/or tune the television 16 to an appropriate channel, execution proceeds immediately to step 1128.

In step 1128, the appropriate voice prompts and graphic screens are played and displayed to verify receipt of the customer's amenity selection. In step 1130, the voice prompts and graphic screens may be used to prompt the customer to enter billing information, which is received by the store-and-forward switch 20. In step 1132, a billing data base (not shown) is accessed to authorize the use of the received billing information. Validation and authorization of the billing information is described in detail with reference to steps 153–157 of FIG. 9 and will not be repeated here. Alternatively, the facility or service provider may choose not to validate the received billing information until after selection of the amenity (post-validation) or subsequent to the transaction, in which case the billing information number and telephone identification code are stored on the hard disk of the central distribution computer 50 or the store-and-forward switch 20 to be retrieved at a later time for validation and processing. In addition, if the computer 50 is connected to a property management system 17, the customer may be given the choice of placing the amenity charge on the room bill. Billing information can be displayed to the customer with the voice prompts and/or graphic screens. In step 1134, completion of the billing routine may be acknowledged with voice prompts and graphic screens.

Upon completion of the billing routine, execution proceeds to step 1134, in which the call is routed to the appropriate amenity. If the amenity is the movie service, the call is routed to the central distribution computer 50. As explained with reference to FIG. 1A, the store-and-forward switch 50A and the computer 50 may comprise a single unit. Alternatively, the call is not routed to the amenity in step 1134 and instead execution proceeds from step 1132 directly to step 1134. In step 1134, voice prompts and graphic screens that describe the amenity service are broadcast. For example, the voice prompts may list various goods and services available for sale and the graphic screens can be used to broadcast graphics or pictures of the goods and services. In addition, the voice prompts and graphic screens may be used to describe to the customer how to purchase the goods and services.

In step 1140, a determination is made whether the customer has selected goods or services by pressing the appropriate key(s) on the keypad 56. If the customer has not selected goods or services, execution proceeds to step 1141 in which a determination is made whether a predetermined time period has elapsed. If not, execution returns to step 1140; otherwise, execution proceeds to step 1141a, in which the call is terminated. If in step 1140 the customer has selected a movie, execution proceeds to step 1142, in which the central distribution computer 50 queries the room unit 15 to determine whether the room unit 15 is tuned to a channel on which a movie can be received (usually channels 2 and/or 3). If the room unit 15 is not tuned to an appropriate channel, execution proceeds to step 1144, in which the computer 50 automatically switches the room unit 15 to the appropriate channel. Execution then proceeds to step 1146. If in step 1142 the room unit 15 is tuned to an appropriate channel, execution proceeds directly to step 1146.

In step 1146, the central distribution computer 50 queries the room unit 15 to determine whether the television 16 is turned on and tuned to a channel on which a movie can be received (again, usually 2 and/or 3). If the television 16 is not turned on and/or tuned to an appropriate channel, execution proceeds to step 1148 and the voice prompts 130 are accessed to instruct the customer to turn on and/or tune the television 16 to an appropriate channel. Execution then proceeds to step 1150. In step 1150, a determination is made whether the customer has tuned the television 16 to an appropriate channel, at which time execution proceeds to step 1152. If in step 1146 the television 16 is tuned to an appropriate channel, execution proceeds directly to step 1152.

In step 1152, a determination is made whether the movie is a "pay-per-view" type movie, which is broadcast at a preselected time to all customers who select to view that movie. If the movie is a pay-per-view movie, execution proceeds to step 1154, in which the room unit 15 is activated to receive the movie and execution proceeds to step 1156. If in step 1036 it is determined that the movie is not a pay-per-view movie, but an "on-demand" type movie, which is shown immediately and only to the customer who selected it, execution proceeds immediately to step 1156. In step 1156, the movie is transmitted from the video unit 26 to the room unit 15 for viewing on the television 16 by the customer. Execution terminated in step 1158.

Figure 12:
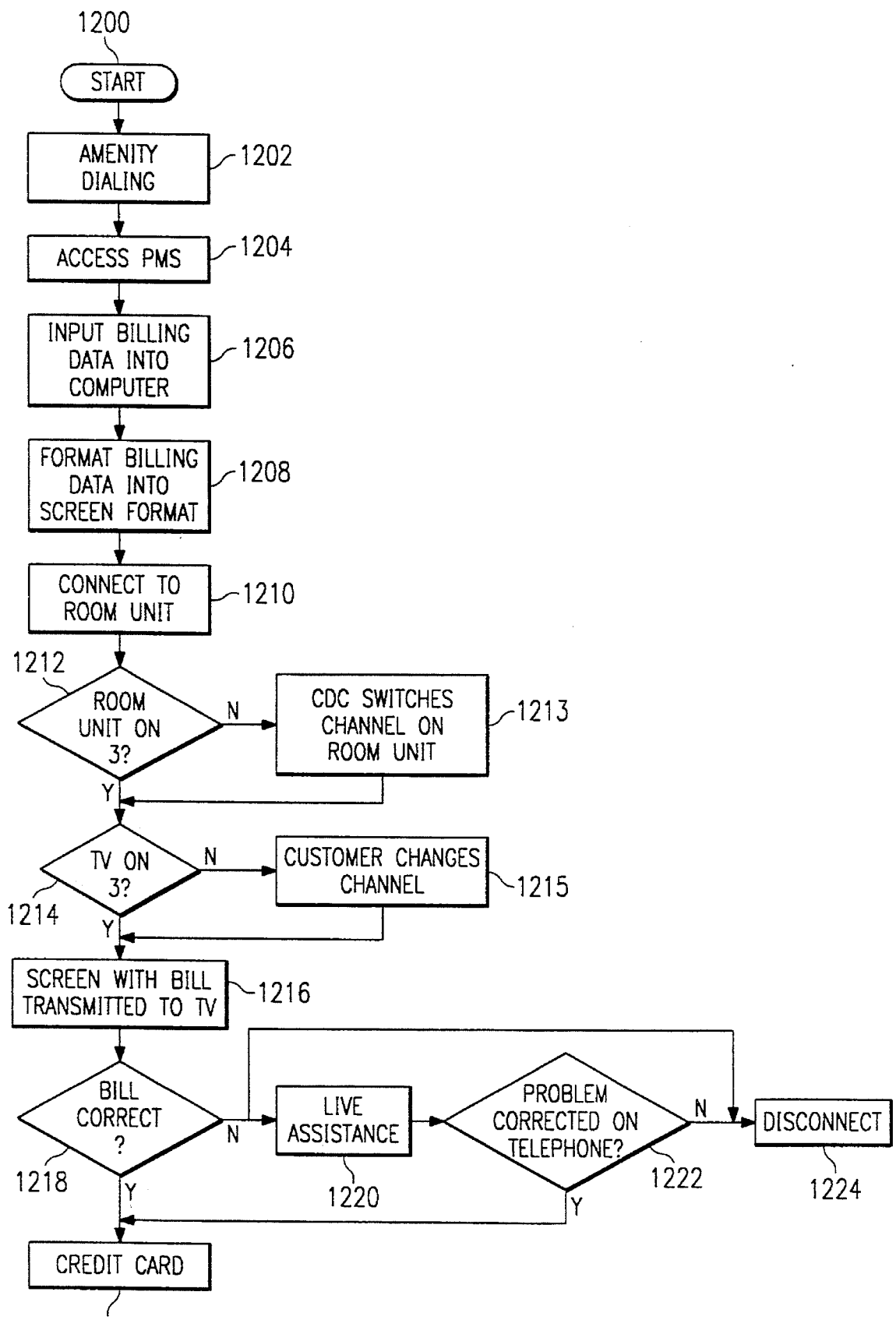
FIG. 12 is a flow chart illustrating the use of the telephone to pay the room bill.

FIG. 12 is a flow chart illustrating the use of the access phone 10 and television 16 to pay the room bill. Execution begins in step 1200 and proceeds immediately to step 1202, in which the central distribution computer 50 and the store-and-forward switch 50A are accessed. In step 1204, the computer 50 accesses the property management system 17. In step 1206, the room billing data is input into the computer 50 from the property management system 17. In step 1208, the room billing data is arranged by the computer 50 in a screen format suitable for displaying on the television 16 as a billing screen.

In step 1210, the computer 50 is connected to the room unit 15. In step 1212, a determination is made whether the room unit 15 is tuned to an appropriate channel for viewing the billing screen. If the room unit 15 is not tuned to an appropriate channel, execution proceeds to step 1213, in which the computer 50 automatically tunes the room unit 15 to an appropriate channel. Execution then proceeds to step 1214. If in step 1212, the room unit 15 is tuned to an appropriate channel, execution proceeds immediately to step 1214.

In step 1214, a determination is made whether the television 16 is turned on and tuned to an appropriate channel for viewing the billing screen. If not, execution proceeds to step 1215 and the customer is prompted (via voice prompts 130) to turn on and/or tune the television to an appropriate channel. Execution then returns to step 1214. If in step 1214, the television is turned on and tuned to an appropriate channel, execution proceeds to step 1216.

In step 1216, the billing screen is transmitted to the television 16. In step 1218, voice prompts 130 and graphic screens are used to prompt the customer to indicate whether the bill is correct by pressing the appropriate key on the keypad 58, for example, 1 if the bill is correct and 2 if the bill is incorrect. If a determination is made that the bill is correct, execution proceeds to step 1226, in which the credit card routine (FIG. 7) is executed. If in step 1218 a determination is made that the bill is incorrect, execution proceeds to step 1220. In step 1220, the access phone 10 is connected to a facility operator or other employee for assistance in correcting the bill. In step 1222, a determination is made whether the bill dispute can be settled over the telephone. If not, execution proceeds to step 1226, in which the credit card routing (FIG. 7) is executed. It is understood that the customer may use a credit or debit card with the card reader 62 or may enter the billing information manually using the keypad 56. If the facility does not have a property management system 17, execution will proceed from step 1226 directly to step 1224, in which the call is terminated.

In summary, there has been provided a system that is operable to allow access between a phone system on a PBX, a pay-per-view television system, and amenities disposed on a public switching network. A store-and-forward switch is provided off of the public switching network which is called by the telephone. Information is then transmitted from the telephone to the store-and-forward switch containing billing information regarding the particular user. This information is then validated and then the amenity contacted and authorized to provide the amenity to the user. Billing is maintained at the store-and-forward switch location, independent of both the amenity and the user. The store-and-forward switch also can be connected to the central distribution computer of a pay-per-view television system. The access phone, store-and-forward switch, and central distribution computer can interact to furnish voice prompts and graphic screens to offer and provide amenity services to the user.

Although the preferred embodiment has been described in detail, it should be understood that various changes, substitutions and alterations can be made therein without departing from the spirit and scope of the invention as defined by the appended claims.

What is claimed is:

1. Apparatus for accessing and paying for video entertainment amenities by a user at an amenity location connected to a pay-per-view (PPV) system, the apparatus comprising:

a telephone for entering billing information and amenity identification information;

a central distribution computer (CDC) connected to said telephone and said PPV system for storing and processing said entered billing and amenity identification information to facilitate the payment for said amenity and presentation of said amenity by said PPV system, said CDC including a store-and-forward switch (SFS) connectable to said telephone for storing and processing said entered information, and a graphics circuit connected to said SFS for generating user prompts to said PPV system responsive to said SFS processing, said CDC determining whether a prompt is to be initiated and determining the content of the prompt, thereby providing an interactive session between said PPV system and said telephone via the SFS; and a billing data base connected to said CDC for storing entered billing information received by said CDC.

2. The apparatus of claim 1 further comprising a billing data base connected to said CDC for validating entered billing information received from said CDC.

3. The apparatus of claim 2 wherein said data base returns an authorization signal to said CDC upon receipt from said CDC of valid billing information, said CDC preventing said amenity presentation by said PPV system until said authorization signal is returned.

4. The apparatus of claim 1 wherein said SFS issues user prompts to said telephone responsive to said processing.

5. The apparatus of claim 1 wherein said SFS user prompts and said graphics circuit user prompts correspond with each other to convey consistent information to said user.

6. The apparatus of claim 4 wherein said SFS user prompts are audio voice prompts.

7. The apparatus of claim 1 wherein said graphics circuit user prompts are visually displayed by said PPV system.

8. The apparatus of claim 1 wherein said graphics circuit user prompts comprise said billing information and, responsive to said user entry of billing information on said telephone, said graphics circuit displays said billing information with said PPV system to said user.

9. The apparatus of claim 1 wherein said billing information comprises a credit or debit card number.

10. The apparatus of claim 1 wherein said graphic circuit user prompts comprise help prompts for assisting the user in selecting and entering billing information.

11. The apparatus of claim 1 wherein said graphic circuit user prompts comprise help prompts for assisting the user in selecting and accessing an amenity.

12. The apparatus of claim 1 wherein said graphic circuit user prompts comprise confirmation prompts for confirming billing information validation and amenity selection.

13. The apparatus of claim 1 wherein said graphic circuit user prompts comprise promotional information for advertising available amenities.

14. The apparatus of claim 1 wherein said CDC further comprises a radio frequency modem for operationally interconnecting said CDC and said PPV system.

15. The apparatus of claim 1 wherein said CDC further comprises a telecommunications modem for operationally interconnecting said CDC and said data base.

16. The apparatus of claim 1 wherein said CDC monitors the presentation of said amenity by said PPV for a predetermined period of time before billing said user for said amenity.

17. The apparatus of claim 1 further comprising a private branch exchange (PBX) interconnecting said telephone and said CDC.

18. The apparatus of claim 1 further comprising a telecommunications network connected to said telephone and said CDC for access of remote amenities.

19. The apparatus of claim 1 further comprising a telecommunications network connected to said telephone and said CDC for access of remote billing services.

20. The apparatus of claim 1 further comprising a property management system connected to said CDC for billing based on a unique identification of the amenity location of said telephone.

21. The apparatus of claim 1 wherein said PPV system comprises:

a video unit connected to said CDC for initiating an amenity presentation responsive to user selection and payment;

a room unit connected to said video unit for receiving said amenity presentation at a selected amenity location; and a television connected to said room unit for displaying said amenity presentation to the user.

22. The apparatus of claim 21 wherein said room unit is connected to said CDC for receiving user prompts to be displayed on said television.

23. The apparatus of claim 1 wherein said telephone comprises means for user entry of billing information to said CDC.

24. The apparatus of claim 23 wherein said user entry means comprises a card reader.

25. The apparatus of claim 23 wherein said user entry means comprises a dual tone multifrequency (DTMF) keypad.

26. Apparatus connected to a telecommunications network for providing amenities to a user at an amenity location on a television connected to a pay-per-view (PPV) system, the apparatus comprising:

a telephone connectable to said network for entering billing information and amenity identification information and for accessing remote amenity or billing validation services;

a central distribution computer (CDC) connected to said telephone and said PPV system for storing and processing said entered billing and amenity identification information to facilitate the payment for said amenity and presentation of said amenity by said PPV system, said CDC including a store-and-forward switch (SFS) connectable to said telephone for storing and processing said entered billing and amenity identification information and a graphics circuit connected to said SFS for generating user prompts with said PPV system responsive to said SFS processing said CDC determining whether a prompt is to be initiated and determining the content of the prompt, thereby providing an interactive session between said PPV system and said telephone via the SFS; and a billing data base connected to said CDC for validating entered billing information received by said CDC, wherein said data base returns an authorization signal to said CDC upon receipt from said CDC of valid billing information, said CDC preventing said amenity presentation by said PPV system until said authorization signal is returned.

27. The apparatus of claim 26 wherein said CDC further comprises:

logic for causing said SFS to issue audio prompts to said telephone responsive to said processing; and logic for causing said graphics circuit to issue prompts to said PPV system for presentation by said television responsive to said processing.

28. The apparatus of claim 26 wherein said CDC further comprises:

logic for causing said graphic circuit to present on said television user prompts for assisting the user in selecting and entering billing information;

logic for causing said graphic circuit to present on said television user prompts for assisting the user in selecting and accessing an amenity; and logic for causing said graphic circuit to present on said television user prompts for assisting the user in confirming billing information and amenity selection.

29. Apparatus connected to a telecommunications network for providing amenities to a user at an amenity location on a television connected to a pay-per-view (PPV) system, the apparatus comprising:

a telephone connectable to said network for entering billing information and amenity identification information and for accessing remote amenity or billing validating services;

a central distribution computer (CDC) connected to said telephone and said PPV system for storing and processing said entered billing and amenity identification information to facilitate the payment for said amenity and presentation of said amenity by said PPV system, said CDC including means connectable to said telephone for storing and processing said entered information, and means connected to said storing and processing means for generating user prompts with said PPV system responsive to said processing, said CDC determining whether a prompt is to be initiated and determining the content of the prompt, thereby providing an interactive session between said PPV system and said telephone via the SFS; and a billing data base connected to said CDC for validating entered billing information received by said CDC, wherein said data base returns an authorization signal to said CDC upon receipt from said CDC of valid billing information, said CDC preventing said amenity presentation by said PPV system until said authorization signal is returned.

30. The apparatus of claim 29 wherein said CDC further comprises:

logic for causing said storing and processing means to issue audio prompts to said telephone responsive to said processing; and logic for causing said generating means to issue prompts to said PPV system for presentation by said television responsive to said processing.

31. The apparatus of claim 29 wherein said CDC further comprises:

logic for causing said generating means to present on said television user prompts for assisting the user in selecting and entering billing information;

logic for causing said generating means to present on said television user prompts for assisting the user in selecting and accessing an amenity; and logic for causing said generating means to present on said television user prompts for assisting the user in confirming billing information and amenity selection.

32. A method for accessing and paying for video entertainment amenities by a user at an amenity location connected to a pay-per-view (PPV) system, the method comprising:

entering billing information and amenity identification information using a telephone;

storing and processing said entered information to facilitate payment for and presentation of said amenity;

responsive to said processing, displaying graphic user prompts to said user with said PPV system, said PPV system determining whether a prompt is to be initiated and determining the content of the prompt, thereby providing an interactive session between said PPV system and said telephone; and validating said entered billing information.

33. The method of claim 32 wherein said validating comprises:

transmitting said entered billing information to a billing data base; and preventing said amenity presentation until said billing data base returns an authorization signal.

34. The method of claim 32 further comprising:

responsive to said processing, issuing audio user prompts to said user with said telephone.

35. The method of claim 34 wherein said audio user prompts and said graphics user prompts correspond with each other to convey consistent information to said user.

36. The method of claim 32 further comprising:

responsive to said user entry of billing information, displaying said entered billing information to said user with said PPV system.

37. The method of claim 32 wherein said entered billing information comprises a credit or debit card number.

38. The method of claim 32 further comprising:

using said graphic user prompts to assist said user in selecting and entering billing information.

39. The method of claim 32 further comprising:

using said graphic user prompts to assist the user in selecting and accessing an amenity.

40. The method of claim 32 further comprising:

using said graphic user prompts to confirm billing information validation and amenity selection.

41. The method of claim 32 further comprising:

accessing remote amenities with said telephone.

42. The method of claim 32 further comprising:

accessing remote billing services with said telephone.

43. The method of claim 32 further comprising:

storing billing information based on a unique identification of the amenity location of said telephone.

44. The method of claim 32 further comprising:

initiating an amenity presentation responsive to user selection and payment;

receiving said amenity presentation at a selected amenity location; and displaying said amenity presentation to the user with said PPV system.

45. The method of claim 32 further comprising:

monitoring presentation of said amenity for a predetermined period of time before billing said user for said amenity.

* * * * *